(12) United States Patent
Rennig et al.

(10) Patent No.: US 12,047,198 B2
(45) Date of Patent: *Jul. 23, 2024

(54) CONTROLLER AREA NETWORK DATA LINK LAYER PROTOCOL PROCESSING SYSTEM, RELATED INTEGRATED CIRCUIT, DEVICE AND METHOD

(71) Applicant: STMICROELECTRONICS APPLICATION GMBH, Aschheim-Dornach (DE)

(72) Inventors: Fred Rennig, Nandlstadt (DE); Rolf Nandlinger, Herrsching (DE)

(73) Assignee: STMICROELECTRONICS APPLICATION GMBH, Aschheim-Dornach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,764

(22) Filed: May 19, 2023

(65) Prior Publication Data
US 2023/0299999 A1 Sep. 21, 2023

Related U.S. Application Data

(63) Continuation of application No. 17/539,936, filed on Dec. 1, 2021, now Pat. No. 11,695,589.

(30) Foreign Application Priority Data

Dec. 10, 2020 (IT) .................. 102020000030434

(51) Int. Cl.
*H04L 12/40* (2006.01)
*G06F 13/40* (2006.01)
*G06F 13/42* (2006.01)

(52) U.S. Cl.
CPC .... *H04L 12/40013* (2013.01); *G06F 13/4022* (2013.01); *G06F 13/426* (2013.01);
(Continued)

(58) Field of Classification Search
CPC ......... H04L 12/40013; H04L 12/40169; G06F 13/4022; G06F 13/426
See application file for complete search history.

(56) References Cited

U.S. PATENT DOCUMENTS 11,695,589 B2 *  7/2023  Rennig ............. H04L 12/40169
                                                   710/305
2010/0239028 A1  9/2010  Lu et al.
(Continued)

FOREIGN PATENT DOCUMENTS

CN   107317734 A   11/2017
CN   109947073 A   6/2019
(Continued)

*Primary Examiner* — Phong H Dang
(74) *Attorney, Agent, or Firm* — Seed IP Law Group LLP

(57) ABSTRACT

A device has a plurality of CAN XL communication systems, a bus, and a switching circuit. The bus has a transmission node and reception node, and receives from each CAN XL communication system a respective second transmission signal and drives the logic level at the transmission node as a function of the logic levels of the second transmission signals, and provides to each CAN XL communication system a respective second reception signal having a logic level determined as a function of the logic level at the reception node. The switching circuit supports a plurality of modes. In a first mode, the switching circuit is configured to provide the NRZ encoded transmission signals of the CAN XL communication systems as the second transmission signals to the bus system, and provide the respective second reception signal received from the bus to the CAN XL protocol controllers of the CAN XL communication system.

20 Claims, 12 Drawing Sheets

(52) U.S. Cl.
CPC .......... *H04L 12/40169* (2013.01); *H04L 2012/40215* (2013.01); *H04L 2012/40273* (2013.01)

(56) References Cited

U.S. PATENT DOCUMENTS

| | | | |
|---|---|---|---|
| 2020/0250127 A1* | 8/2020 | Muth | H04L 25/4906 |
| 2020/0382340 A1 | 12/2020 | Muth | |
| 2021/0258352 A1 | 8/2021 | Leuwer et al. | |
| 2021/0266193 A1* | 8/2021 | Bijjala | H04L 12/4013 |
| 2021/0374083 A1* | 12/2021 | de Haas | H04L 12/40013 |
| 2021/0389972 A1* | 12/2021 | Muth | H04L 25/4904 |

FOREIGN PATENT DOCUMENTS

| | | |
|---|---|---|
| CN | 111505974 A | 8/2020 |
| CN | 112019413 A | 12/2020 |
| EP | 1304837 A1 | 4/2003 |

\* cited by examiner

CONTROLLER AREA NETWORK DATA LINK LAYER PROTOCOL PROCESSING SYSTEM, RELATED INTEGRATED CIRCUIT, DEVICE AND METHOD

BACKGROUND

Technical Field

Embodiments of the present disclosure relate to processing systems comprising a CAN XL transceiver.

Description of the Related Art

FIG. 1 shows a typical electronic system, such as the electronic system of a vehicle, comprising a plurality of processing systems 10, such as embedded systems or integrated circuits, e.g., a Field Programmable Gate Array (FPGA), a Digital Signal Processor (DSP) or a microcontroller (e.g., dedicated to the automotive market).

For example, in FIG. 1 are shown three processing systems $10_1$, $10_2$ and $10_3$ connected through a suitable communication system 20.

For example, the communication system may include a vehicle control bus, such as a Controller Area Network (CAN) bus, and possibly a multimedia bus, such as a Media Oriented Systems Transport (MOST) bus, connected to vehicle control bus via a gateway.

Typically, the processing systems 10 are located at different positions of the vehicle and may include, e.g., an Engine Control Unit, a Transmission Control Unit, an Antilock Braking System (ABS), a body control module, and/or a navigation and/or multimedia audio system. Such systems are usually identified as Electronic Control Units (ECU).

Accordingly, the processing systems 10 may control different operations of the vehicle, wherein each processing system 10 may implement one or more functions/operations. For example, the engine control is subject to thermodynamic laws that should be balanced with the real-time state of the vehicle. Typically, the real time state of the vehicle is monitored via sensors, which may be connected directly to the processing system 10 implementing the Engine Control Unit or to other processing systems 10 of the vehicle. Similarly, in order to control/command the operation the motor, the Engine Control Unit has to control/command one or more actuators, e.g., in order to inject the fuel, open a valve for gas discharge, etc., which may be connected directly to the processing system 10 implementing the Engine Control Unit or to other processing systems 10 of the vehicle.

FIG. 2 shows a block diagram of an exemplary digital processing system 10, such as a micro-controller, which may be used in any of the processing systems 10 of FIG. 1.

In the example considered, the processing system 10 comprises at least one processing unit 102, such as a microprocessor, usually the Central Processing Unit (CPU), programmed via software instructions. Usually, the software executed by the processing unit 102 is stored in a program memory 104, such as a non-volatile memory, such as a Flash memory or EEPROM. Generally, the memory 104 may be integrated with the processing unit 102 in a single integrated circuit, or the memory 104 may be in the form of a separate integrated circuit and connected to the processing unit 102, e.g., via the traces of a printed circuit board (PCB). Thus, in general the memory 104 contains the firmware for the processing unit 102, wherein the term firmware includes both the software of a micro-processor and the programming data of a programmable logic circuit, such as a FPGA.

In the example considered, the processing unit 102 may have associated one or more hardware resources 106 selected, for example, from the group of:
- one or more communication interfaces IF, e.g., for exchanging data via the communication system 20, such as a Universal asynchronous receiver/transmitter (UART), Serial Peripheral Interface Bus (SPI), Inter-Integrated Circuit ($I^2C$), Controller Area Network (CAN) bus, and/or Ethernet interface, and/or a debug interface; and/or
- one or more analog-to-digital converters AD and/or digital-to-analog converters DA; and/or
- one or more dedicated digital components DC, such as hardware timers and/or counters, or a cryptographic co-processor; and/or
- one or more analog components AC, such as comparators, sensors, such as a temperature sensor, etc.; and/or
- one or more mixed signal components MSC, such as a PWM (Pulse-Width Modulation) driver.

Accordingly, the digital processing system 10 may support different functionalities. For example, the behavior of the processing unit 102 is determined by the firmware stored in the memory 104, e.g., the software instructions to be executed by a microprocessor 102 of a micro-controller 10. Thus, by installing a different firmware, the same hardware (micro-controller) can be used for different applications.

As mentioned before, in many applications, data have to be exchanged between several processing systems 10. For example, in the automotive sector, and also in many other areas, one or more CAN buses are often used to exchange data between processing systems 10.

For example, FIG. 3 shows a typical situation, where a first processing system $10_1$ and a second processing system $10_2$ are connected to a CAN bus 20.

For example, each of the processing systems $10_1$ and $10_2$, may comprise:
- a CAN bus transceiver 320 configured to be connected to the CAN bus 20;
- a processing unit 102; and
- a communication interface IF configured to connect the processing unit 102 to the CAN bus transceiver 320.

For example, usually such additional CAN bus transceivers 320 are used, because the CAN bus uses different signal levels than the processing unit 102 and/or in order to implement a galvanic isolation. For example, the transceivers 320 may be a CAN or Controller Area Network Flexible Data-Rate (CAN FD) transceiver.

For example, conventional CAN bus transceivers 320 comprises two interfaces. The first interface is configured to exchange data via the CAN bus 20 by transmitting and receiving differential non-return-to-zero (NRZ) encoded signals. Conversely, the second interface is configured to receive a transmission signal Tx and provide a reception signal Rx, wherein the transmission signal Tx and the reception signal Rx are NRZ signals, for example, unipolar non-return-to-zero level (NRZ-L) encoded signals, such as a binary encoded signals being set to high (typically the supply voltage of the processing unit 102) for transmitting a logic "1" or low (typically ground) for transmitting a logic "0".

Accordingly, the communication interface IF may provide the NRZ/binary encoded transmission signal TX to the transceiver 320 and receive the NRZ/binary encoded reception signal RX from the transceiver 320. In turn, the transceiver 320 manages the data exchange on the CAN bus 20.

Accordingly, the communication interface IF implements (at least) the data link layer and optional higher protocol layers, while the transceivers 320 manages the physical layer. Generally, the communication interface IF may be a dedicated hardware CAN interface or implemented (at least in part) via firmware executed by the processing unit 102, e.g., via software instructions.

As shown in FIG. 3, the transceivers 320 may be provided in the form of a separate integrated circuit 32 connected to an integrated circuit 30 comprising the processing unit 102, and the optional hardware interface IF (see, e.g., processing system 10i), or the transceivers 320 may be integrated in the integrated circuit 30 comprising the processing unit 102, and the optional hardware interface IF (see, e.g., processing system 10$_2$). For example, microcontrollers comprising a CAN interface IF and optionally a CAN transceiver 320 are well known in the art. Similarly, the CAN interface IF may also be integrated in the integrated circuit 32 of the transceiver 320.

A new CAN standard, CAN XL, is currently under standardization by the CAN in Automation (CiA) association. Substantially, CAN XL supports a low-speed mode and a high-speed mode. Typically, the low-speed mode is used for arbitration and the high-speed mode is used for data transmission. The CAN XL transceiver 320 needs to switch between the low-speed and the high-speed mode. For example, apart from the transmission speed, also the signal levels of the CAN bus change between the low-speed and the high-speed mode.

Specifically, according to the CAN XL standard, in case of an external CAN transceiver, the same signal TX should be used to transmit data via the transceiver 320, both in the low-speed and the high-speed mode, and the transceiver 320 is configured to understand, based on the properties of the signal TX to either use the low-speed or the high-speed. Specifically, according to the CAN XL standard, the transceiver 320 is configure to receive:
in the low-speed mode, a NRZ (e.g., NRZ-L) encoded signal (e.g., as in CAN FD); and
in the high-speed mode, a Pulse-Width Modulated (PWM) signal, wherein a duty-cycle of (approximately) 33% indicates a bit value "0" and a duty-cycle of (approximately) 67% indicates a bit value "1".

Accordingly, the interface IF has to be configured to generate the signal TX as a NRZ encoded signal for the low-speed mode, or as a PWM signal (with a duty-cycle set either to 33% or 67%) for the high-speed mode.

For example, this is shown in FIG. 4. Specifically, in the example considered, a first integrated circuit 30 comprises a module or circuit 300 being configured as CAN protocol controller, wherein the CAN protocol controller 300 is configured to generate a binary bit sequence to be transmitted via a CAN transceiver 320. Specifically, in the example considered, the CAN protocol controller 300 provides the bit sequence sequentially via a binary transmission signal TXD. As mentioned before, the CAN protocol controller 300 may be implemented via a suitable programming of the processing unit 104 and/or via the hardware interface IF.

In the example considered, the system/integrated circuit 30 is configured to generate at a pin TX either the signal TXD or a PWM signal generated as a function of the TXD, wherein the selection is performed based on whether the high-speed or the low-speed mode should be used.

For example, as schematically shown in FIG. 4, for this purpose the CAN protocol controller 300 may generate a control signal CTR indicating whether the high-speed or the low-speed mode should be used.

Specifically, in the example considered, the signal TXD is also fed to a PWM signal generator circuit 302 configured to a generate a PWM signal having either a duty cycle of (approximately) 33% or 67% as a function of the logic level of the signal TXD. As shown in FIG. 4, for this purpose, the PWM signal generator circuit 302 may also receive a clock signal CLK used to generate the PWM signal.

Accordingly, the system/integrated circuit 30 is configured to apply to the terminal TX:
the signal TXD when the control signal CTR has a first logic level (e.g., low); and
the signal at the output of the PWM signal generator circuit 302 when the control signal CTR has a second logic level (e.g., high).

For example, for this purpose the system/integrated circuit 30 may comprise a selector or multiplexer 304 configured to select the signal TXD or the signal at the output of the PWM signal generator circuit 302 as a function of the control signal CTR.

In the example considered, the pin TX is connected to a corresponding pin of the integrated circuit 32 comprising the transceiver 320.

Specifically, in the example considered, the transceiver 320 comprises a CAN high-speed transmitter circuit 326 and a CAN low-speed transmitter circuit 328. Both transmitter circuits are connected to pins CANH and CANL to be connected to the differential data wires of the CAN bus 20.

In the example considered, the transceiver 320 comprises moreover, a PWM detection circuit 324 configured to determine whether the signal received via the terminal TX is a PWM signal, e.g., by:
determining the time between a rising edge and a falling edge of the signal TX and verifying whether this time is within one or more given ranges; and
optionally determining also the time between two consecutive rising edges, which permits to calculate the duty-cycle.

Accordingly, the circuit 324 may:
in response to determining that the signal TX comprises a PWM signal, set a selection signal SEL to a first logic level indicating the high-speed mode; and
in response to determining that the signal TX does not comprise a PWM signal, set a selection signal SEL to a second logic level indicating the low-speed mode.

Accordingly, the transceiver 320 comprises also a PWM demodulator 322 configured to generate a signal TXDH, which is set for each cycle of the PWM signal to:
a first logic level when the PWM signal has a duty cycle of (approximately) 33%; and
a second logic level when the PWM signal has a duty cycle of (approximately) 67%.

Accordingly, the high-speed transmitter 326 may be configured to transmit the signal TXDH when the selection signal SEL is set to the first logic level indicating the high-speed mode, and the low-speed transmitter 328 may be configured to transmit the signal TX when the selection signal SEL is set to the second logic level indicating the low-speed mode.

The transceiver 320 comprises also a high-speed receiver circuit 330 configured to generate a signal RXH by analyzing the voltage between the terminals CANH and CANL, and a low-speed receiver circuit 333 configured to generate a signal RXL by analyzing the voltage between the terminals CANH and CANL. Generally, only one of these receiver circuits may be enabled as a function of the selection signal SEL, or as shown in FIG. 4, the pin RX of the transceiver 320 may be driven by the signal RXH when the selection signal is set to the first logic level indicating the high-speed mode, and the signal RXL when the selection signal is set to the second logic level indicating the low-speed mode.

Specifically, according to the CAN XL standard, both the signal RXH and the signal RXL are NRZ encoded signals, such as binary encoded signals.

In the example considered, the pin RX of the integrated circuit 32/transceiver 320 is connected to a respective pin RX of the integrated circuit 30, wherein this pin provides a reception data signal RXD to the CAN protocol controller 300.

Accordingly, by knowing whether the high-speed mode or the low-speed mode has been activated, the CAN protocol controller 300 may correctly determine the received bit-sequence of the signal RXD.

Therefore, according to the CAN XL standard, each processing system connected to the CAN bus 20 requires a respective CAN XL transceiver 320.

BRIEF SUMMARY

The inventors have observed that processing systems 10, such as the ECU of a vehicle, may comprise also a plurality of processing units 102, which may be integrated in the same integrated circuit or provided as separate integrated circuits and connected together on a common printed circuit board. Accordingly, one or more of such processing units may be configured to exchange data on a CAN bus, e.g., for communication with other processing units 102 of the same processing system 10 or with other processing systems 10. Accordingly, in this case, providing a CAN transceiver 320 for each of this processing units may involve significant costs. An embodiment facilitates managing the communication on a CAN XL bus, without a CAN XL transceiver being necessary for each processing unit.

In various embodiments, a processing system comprises a first CAN XL communication system and a second CAN XL communication system. Specifically, in various embodiments, each of the first and the second CAN XL communication system comprises a CAN XL protocol controller configured to generate a NRZ encoded transmission signal wherein the NRZ encoded transmission signal has a first bit rate in a high-speed mode and second bit rate in a low-speed mode, and wherein the CAN XL protocol controller is configured to receive a NRZ encoded reception signal. A Pulse-Width Modulated (PWM) signal generator circuit is configured to, when the NRZ encoded transmission signal has the first bit rate, generate a PWM signal having a first duty cycle when the NRZ encoded transmission signal is set to high and a second duty cycle when the NRZ encoded transmission signal is set to low. A selector circuit is configured to generate a first transmission signal by selecting the NRZ encoded transmission signal when the NRZ encoded transmission signal has the second bit rate, and the PWM signal when the NRZ encoded transmission signal has the first bit rate.

In various embodiments, the processing system comprises a bus having a transmission node and a reception node. Specifically, the bus is configured to receive from each of the first and the second CAN XL communication system a respective second transmission signal and drive the logic level at the transmission node as a function of the logic levels of the second transmission signals. Moreover, the bus is configured to provide to each of the first and the second CAN XL communication system a respective second reception signal having a logic level determined as a function of the logic level at the reception node.

For example, the bus may comprise at least one logic gate configured to generate the signal at the transmission node via a logic AND combination of the second transmission signals. Alternatively, the bus system may comprise a first and a second open-drain driver circuit, wherein an input of the first open-drain driver is connected to the second transmission signal of the first CAN XL communication system, an input of the second open-drain driver is connected to the second transmission signal of the second CAN XL communication system, and outputs of the first and the second open-drain driver circuit are connected to the transmission node.

In various embodiments, the processing system comprises also a switching circuit configured to support a plurality of modes.

For example, in a first mode, the switching circuit may be configured to provide the NRZ encoded transmission signals of the first and the second CAN XL communication systems as the second transmission signals to the bus system, and provide the respective second reception signals received from the bus to the CAN XL protocol controllers of the first and the second CAN XL communication system.

For example, in various embodiments, in the first mode, the transmission node of the bus may be connected to the reception node of the bus. Accordingly, in this case, the first and the second CAN XL communication system may exchange data directly via the bus, while still using the CAN XL protocol format for the NRZ encoded transmission signal. In various embodiments, the processing system comprises a terminal, wherein, in the first mode, the transmission node of the bus is connected to this terminal. Accordingly, in this case, the transmission terminal may be connected to a third CAN XL communication system. Accordingly, the third CAN XL communication system is connected to the bus and the first, second and third CAN XL communication system may exchange data without using a CAN XL transceiver.

In an embodiment, the switching circuit is programmable, e.g., via a microprocessor of the processing system. For example, in various embodiment, the switching circuit is configured to selectively connect the transmission node of the bus to the reception node of the bus, and/or the transmission node of the bus to the previous mentioned terminal.

In various embodiments, the processing system may also comprise a transmission terminal and a reception terminal configured to be connected to a CAN XL transceiver. Accordingly, in a second mode, the switching circuit may be configured to provide the first transmission signal of the first CAN XL communication system to the transmission terminal, and provide the signal at the reception terminal to the CAN XL protocol controller of the first CAN XL communication system. Accordingly, in this case, one or more of the CAN XL communication system may communicate with a CAN XL bus via a respective CAN XL transceiver.

In various embodiments, the bus may also be used to use a single CAN XL transceiver for the first and the second CAN XL communication system. Specifically, in various embodiments, each CAN XL protocol controller is configured to:

during an arbitration phase, generate the respective NRZ encoded transmission signal with the second (low-speed) bit rate;

determine whether the respective NRZ encoded reception signal indicates that the CAN XL protocol controller may transmit data; and in response to determining that the CAN XL protocol controller may transmit data, during a data transmission phase, set a control signal and generate the respective NRZ encoded transmission signal with the first (high-speed) bit rate.

In this case, the processing system may comprise a transmission terminal and a reception terminal, and the transmission terminal and the reception terminal may be connected to a CAN XL transceiver. Specifically, in this case the switching circuit may be configured (e.g., in a third mode) to manage a first (arbitration) and second (data transmission) phase.

Specifically, during the first phase, the switching circuit may provide the NRZ encoded transmission signals of the first and the second CAN XL communication systems as the second transmission signals to the bus system and provide the signal at the transmission node of the bus to the transmission terminal. Similarly, the switching circuit may provide the signal at the reception terminal to the reception node of the bus and provide the respective second reception signals received from the bus to the CAN XL protocol controllers of the first and the second CAN XL communication system. Accordingly, in this way, the CAN XL protocol controllers may manage the arbitration phase via the NRZ encoded transmission signal and possibly set the respective control signal.

Conversely, during the second phase, the switching circuit may verify whether one of the control signals generated by the CAN XL protocol controller is set. In response to determining that one of the control signals is set, the switching circuit may then provide the first transmission signal or the PWM signal of the respective CAN XL communication system to the second transmission terminal. Accordingly, in this way, a given CAN XL protocol controller may transmit the respective NRZ encoded transmission signal, which is encoded via the respective PWM signal.

In an embodiment, a processing system comprises: a first controller area network data link layer protocol, CAN XL, communication system and a second CAN XL communication system, the first and second CAN XL communication systems each including: a CAN XL protocol controller, which, in operation: generates a non-return-to-zero, NRZ, encoded transmission signal, wherein the NRZ encoded transmission signal (TXD) has a first bit rate in a high-speed mode and second bit rate in a low speed mode; and receives a NRZ encoded reception signal; a Pulse-Width Modulated, PWM, signal generator circuit, which, in operation, when said NRZ encoded transmission signal has said first bit rate, generates a PWM signal having a first duty cycle when said NRZ encoded transmission signal is set to high and a second duty cycle when said NRZ encoded transmission signal is set to low; and a selector circuit, which, in operation, generates a first transmission signal by selecting: said NRZ encoded transmission signal when said NRZ encoded transmission signal has said second bit rate; and said PWM signal when said NRZ encoded transmission signal has said first bit rate; a bus having a transmission node and a reception node, wherein the bus, in operation: receives from each of said first and said second CAN XL communication systems a respective second transmission signal and drives a logic level at said transmission node as a function of logic levels of the second transmission signals (TXD2); and provides to each of said first and said second CAN XL communication systems a respective second reception signal having a logic level based on a logic level at said reception node; and a switching circuit, which, in operation, supports a plurality of switching modes, wherein, in a first switching mode, said switching circuit, in operation: provides said NRZ encoded transmission signals of said first and said second CAN XL communication systems as said second transmission signals to said bus; and provides the respective second reception signal received from said bus to the CAN XL protocol controllers of said first and said second CAN XL communication systems.

In an embodiment, a system comprises: a first processing device; and a second processing device coupled to the first processing device. The second processing device includes at least two controller area network data link layer protocol, CAN XL, communication systems. Each CAN XL communication system includes: a CAN XL protocol controller, which, in operation: generates a non-return-to-zero, NRZ, encoded transmission signal, wherein the NRZ encoded transmission signal (TXD) has a first bit rate in a high-speed mode and second bit rate in a low speed mode; and receives a NRZ encoded reception signal; a Pulse-Width Modulated, PWM, signal generator circuit, which, in operation, when said NRZ encoded transmission signal has said first bit rate, generates a PWM signal having a first duty cycle when said NRZ encoded transmission signal is set to high and a second duty cycle when said NRZ encoded transmission signal is set to low; and a selector circuit, which, in operation, generates a first transmission signal by selecting: said NRZ encoded transmission signal when said NRZ encoded transmission signal has said second bit rate; and said PWM signal when said NRZ encoded transmission signal has said first bit rate. The system includes a bus having a transmission node and a reception node, wherein the bus, in operation: receives from each of said first and said second CAN XL communication systems a respective second transmission signal and drives a logic level at said transmission node as a function of logic levels of the second transmission signals (TXD2); and provides to each of said first and said second CAN XL communication systems a respective second reception signal having a logic level based on a logic level at said reception node. The system includes a switching circuit, which, in operation, supports a plurality of switching modes, wherein, in a first switching mode, said switching circuit, in operation: provides said NRZ encoded transmission signals of said first and said second CAN XL communication systems as said second transmission signals to said bus; and provides the respective second reception signal received from said bus to the CAN XL protocol controllers of said first and said second CAN XL communication systems. In an embodiment, the first and second processing devices, in operation, generate control signals associated with a vehicle.

In an embodiment, a method comprises controlling coupling circuitry coupled to a plurality of controller area network data link layer protocol (CAN XL) communication systems, the coupling circuitry including a bus system and a switching circuit. The controlling includes, in a first mode of a plurality of modes of operation of the coupling circuitry: coupling non-return-to-zero (NRZ) encoded transmission signals of the plurality of CAN XL communication systems to the bus system; and coupling respective reception signals received from the bus to CAN XL protocol controllers of the CAN XL communication systems. In an embodiment, a non-transitory computer-readable medium's contents configure coupling circuitry to perform a method disclosed herein.

BRIEF DESCRIPTION OF THE SEVERAL VIEWS OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
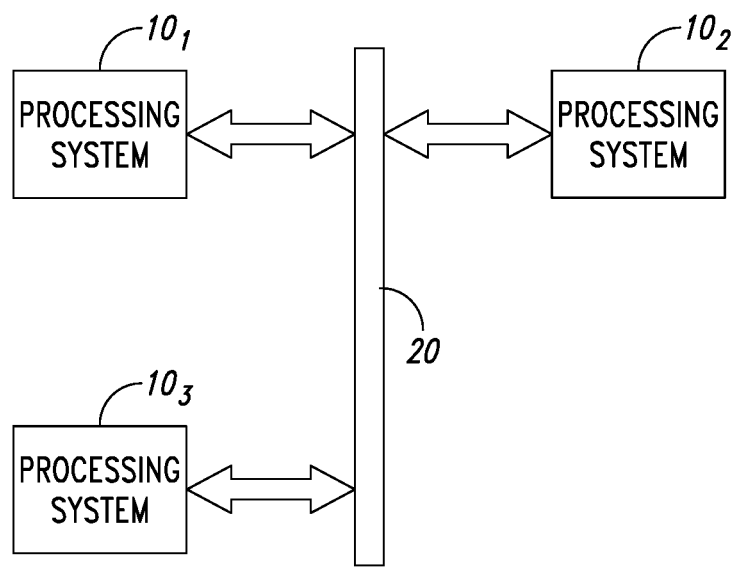
FIG. 1 shows an example of an electronic system comprising a plurality of processing systems configured to exchange data via a communication bus.
Figure 2:
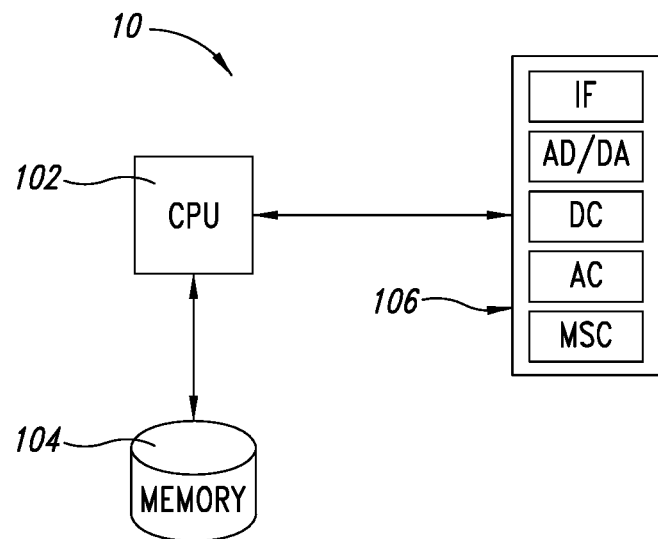
FIG. 2 shows an example of a processing system.
Figure 4:
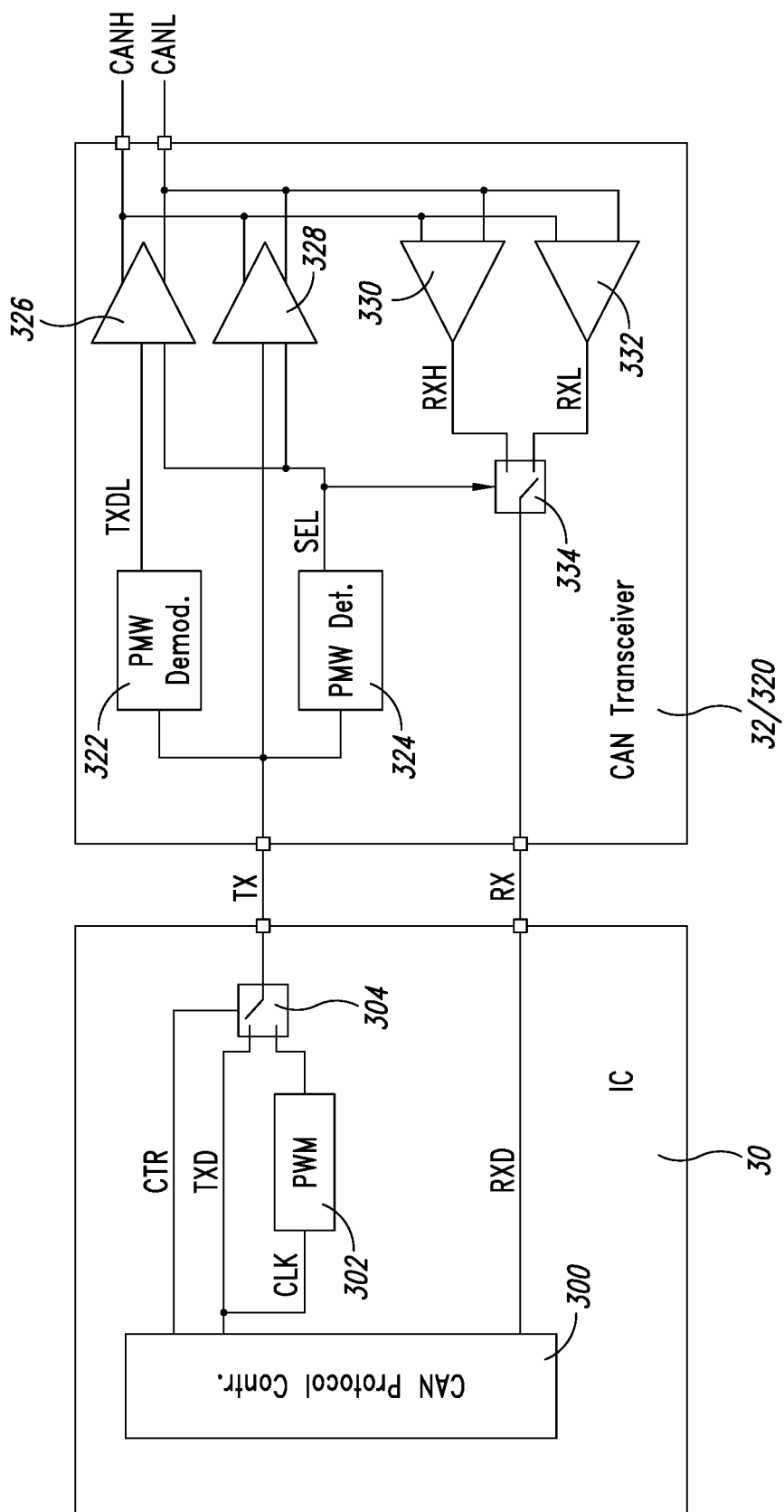
FIG. 4 shows an example of a processing system according to the CAN XL standard.

In the following FIGS. 5 to 15 parts, elements or components which have already been described with reference to FIGS. 1 and 4 are denoted by the same references previously used in such Figures; the description of such previously described elements will not be repeated in the following in order not to overburden the present detailed description.

Figure 3:
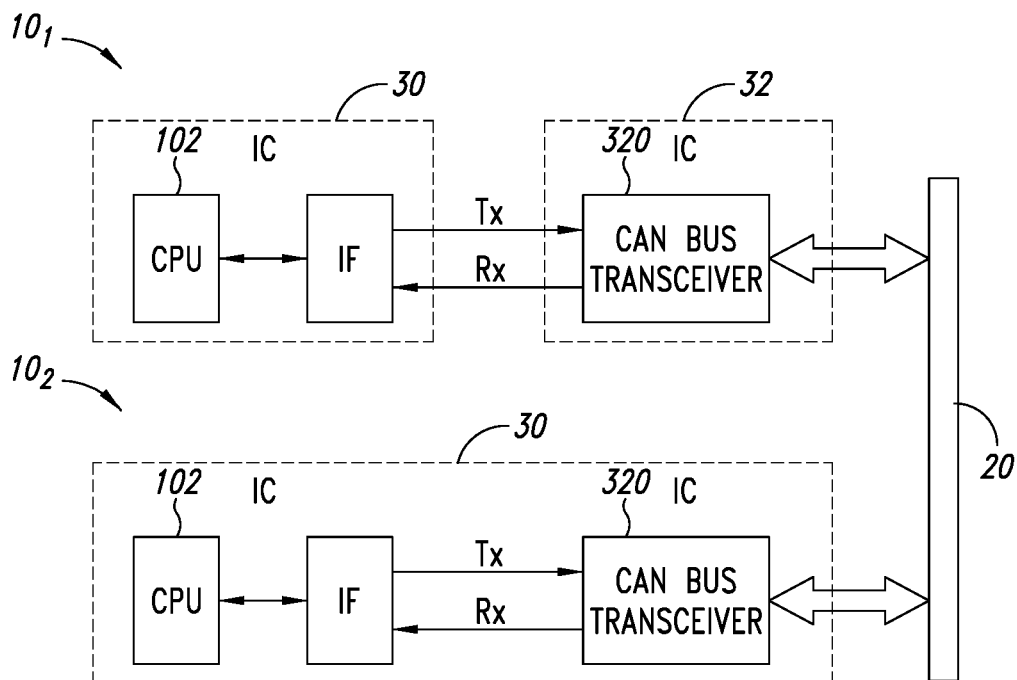
FIG. 3 shows an example of the communication between two processing systems.

As described in the forgoing with respect to FIGS. 1 to 4, in many applications, a plurality of processing units 102 may be connected to a CAN XL bus 20. As shown in FIGS. 3 and 4, the current version of the CAN XL specification requires that each processing unit 102 is connected to the CAN XL bus 20 via a respective transceiver 320. Specifically, as described in the foregoing, the current CAN XL bus standard envisages a transceiver 320 using two modes: a slow-speed mode for arbitration and a high-speed mode for data transmission. Moreover, in order to switch between the modes, the CAN protocol controller 300 has to provide a transmission signal TX which corresponds either to a NRZ encoded signal TXD (low-speed mode) or a PWM signal (high-speed mode).

Specifically, as shown in FIG. 4, the PWM signal may indeed be generated via a PWM generator 302 receiving at input the NRZ encoded signal TXD. Accordingly, the CAN protocol controller 300 indeed generates a single NRZ encoded signal TXD, wherein the bit rate changes for the high-speed and the low-speed mode.

Moreover, irrespective of the operating mode (high-speed or low-speed), the received signal RXD provided by the transceiver 320 and received by the CAN protocol controller 300 is a single NRZ encoded signal RXD, wherein the bit rate changes for the high-speed and the low-speed mode.

Specifically, in various embodiments, the NRZ encoded signals TXD and RXD are non-return to zero level encoded signals, wherein a first voltage (typically the supply voltage of the CAN protocol controller 300) indicates a first logic level (typically "1") and a second voltage (typically the ground level of the CAN protocol controller 300) indicates a second logic level (typically "0").

The inventors also have observed, that the above behavior may be used to exchange data between two processing units 102, without using a CAN bus transceiver 320. In fact, for short distances, e.g., within the same processing system 10, such as within the same printed circuit board, embedded system, or integrated circuit, the bits according to the CAN XL standard may still be reliably transmitted via NRZ encoded signals TXD and RXD, without using a CAN bus transceiver 320, which is required to transmit data over longer distances.

Figure 5:
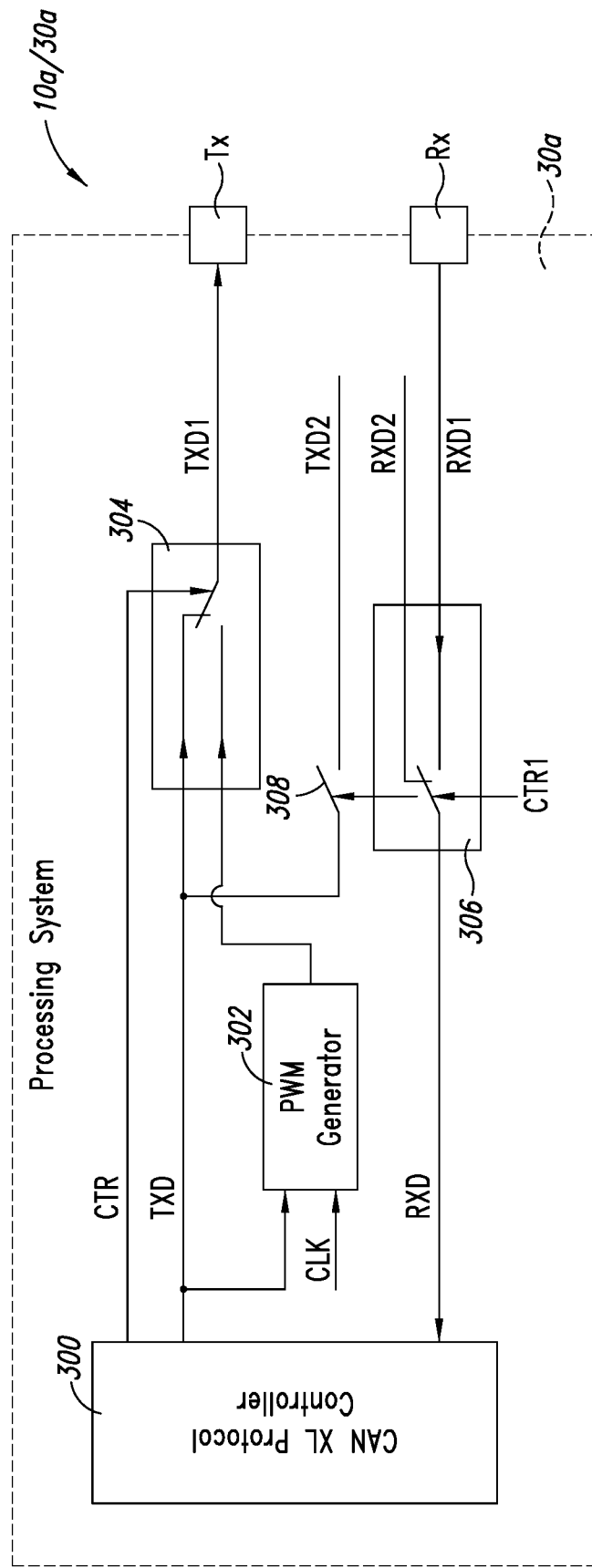
FIG. 5 shows an embodiment of a CAN XL communication system according to the present disclosure.

FIG. 5 shows an embodiment of a processing system 10a according to the present disclosure. For example, such a processing system 10a may be implemented in an integrated circuit 30a.

Specifically, in line with the description of FIG. 4, the processing system 10a comprises a terminal TX for providing a transmission signal according to the CAN XL standard. For example, a respective integrated circuit (IC) 30a may comprise a corresponding pad (in the context of a die, e.g., to be mounted directly on a PCB) or a pin (in the context of a packaged IC, e.g., comprising the die). In the following, will thus be made reference mainly to "pads", even though such a pad may also be connected, e.g., via a wire bonding, to the pin of an IC package.

As mentioned before this transmission signal provided to the terminal/pad TX may be generated by:

generating a NRZ encoded signal TXD via a CAN XL protocol controller 300, wherein the signal TXD has at least a first (low-speed) and second (high-speed) bit rate;

when the signal TXD has the second (high-speed) bit rate, generating via a PWM generator 302 a PWM signal (with duty cycle of 33% or 67%) as a function of the signal TXD; and providing, e.g., via a selector/multiplexer 304, the signal TXD or the PWM signal to the terminal/pad TX as a function of a control signal CTR indicating the low-speed or the high-speed mode, respectively.

Generally, as described in the foregoing, the CAN XL protocol controller 300 may be implemented in any suitable manner via a processing unit 102, such as a microprocessor, and/or a hardware communication interface IF configured to manage one or more layers of the CAN XL protocol stack.

Accordingly, in the embodiment considered, a signal TXD1 at the output of the selector/multiplexer 304 corresponds to a first transmission signal in accordance with the CAN XL standard. In the embodiment considered, the signal TXD is also used as an additional second transmission signal TXD2, wherein this signal has always a NRZ encoding.

In various embodiments, the first transmission signal TXD1 may thus be provided to the terminal Tx, which in turn may be connected to a CAN XL bus via a CAN XL transceiver 320. Conversely, the second transmission signal TXD2 may be connected (directly) to a bus 22, without a CAN XL transceiver. In various embodiments, the bus 22 is a local bus of the processing system 10a, and may be used to connect a plurality of processing units 102 of the same integrated circuit 30a and/or a plurality of processing units 102 of different integrated circuits 30a provided on the same printed circuit board.

Figure 6:
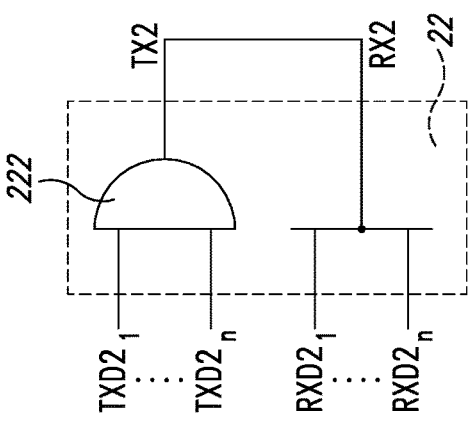

For example, FIG. 6 shows an example of the bus 22, which may be used when a plurality of n processing units 102 of the same integrated circuit 30a have to exchange data. In the embodiment considered, each processing unit 102 (possibly via a respective interface IF) generates thus a respective transmission signal TXD2, transmission signals $TXD2_1 \ldots TXD2_n$, wherein each transmission signal TXD2 is a NRZ signal set either to low (typically ground) or high (typically a supply voltage Vdd of the processing system 10a).

According to the CAN XL standard, in the absence of data transmission, the CAN XL protocol controller 300 is configured to set the transmission signal TXD to high, also the respective signal TXD2 is set to high. Accordingly, in this case, the bus 22 may be implemented with one or more AND gates 222 configured to generate a combined bus signal TX2 by combining via a logic AND operation the signals $TXD2_1 \ldots TXD2_n$, the bus signal TX2 is set to zero when (at least) one of the CAN XL protocol controllers 300 sets the respective transmission signal TXD (and thus the signal TXD2) to low.

In the embodiment considered, the combined bus signal TX2 is also provided to each CAN XL protocol controller 300 as a respective bus reception signal RX2, reception signals $RXD2_1 \ldots RXD2_n$.

Accordingly, as shown in FIG. 5, each processing unit receives a first reception signal RXD1 from the respective pin RX and a second reception signal RXD2 from the bus 22.

Accordingly, in various embodiments, the processing system 10a may comprise a selector/multiplexer 306 configured to provide to the CAN XL protocol controller 300 as reception signal RXD either the first reception signal RXD1 or the second reception signal RXD2, e.g., as a function of a control signal CTR1 indicating whether the communication via the CAN XL bus 20 or the bus 22 is enabled. Generally, the signal CTR1 may also be used to set the signal TXD2 to the logic value of the signal TXD only when the signal CTR1 indicates that the bus 22 should be used. For example, this is schematically shown via a switch 308 between the signal TXD2 and the signal TXD.

Accordingly, when using the bus 22, the NRZ encoded signals TXD2 and RXD2 permit to exchange data between a plurality of CAN XL protocol controllers 300/processing units 102 without an additional CAN XL transceiver 320.

As mentioned before, the solutions shown in FIG. 6 is particularly useful in case the bus 22 is used to connect a plurality of CAN XL protocol controllers 300/processing units 102 within the same integrated circuit 30a.

Figure 7:
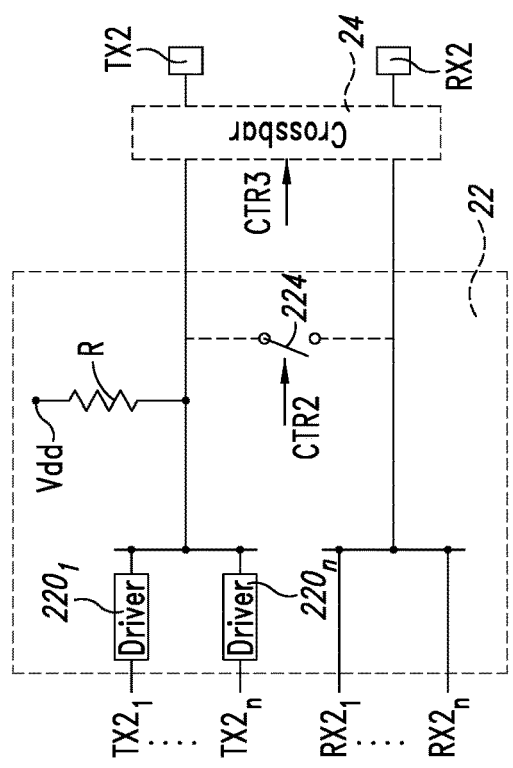

FIG. 7 shows a second embodiment of the bus 22, which may be used as internal and/or external bus.

Specifically, in the embodiment considered, each transmission signal $TXD2_1 \ldots TXD2_n$ is provided via a respective driver circuit 220, circuits $220_1 \ldots 220_n$ to a transmission node TX2. In case the bus 22 may also be used to connect the processing units of the integrated circuit 30a to another integrated circuit, the node TX2 may be connected to a pad of the integrated circuit 30a.

Figure 8:
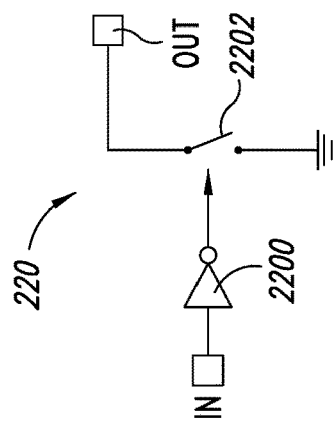
FIGS. 6, 7 and 8 show embodiments of a bus used to connect a plurality of CAN XL communication systems according to the present disclosure.

As shown in FIG. 8, such driver circuits 220 are configured to receive at an input terminal IN a respective transmission signal TXD2 and set an output terminal OUT to floating or to ground. For example, as shown in FIG. 8, for this reason, the terminal OUT may be connected (e.g., directly) via (the current path of) an electronic switch 2202, such as a Field Effect Transistor (FET), to ground. Moreover, the control terminal (e.g., the gate terminal of a FET) may be driven as a function of the signal TXD2 applied to the terminal IN. For example, in the embodiment considered, the electronic switch 2202 is driven via the inverted version of the signal TXD2 applied to the terminal IN, as schematically shown via an inverter 2200. Accordingly, when the signal TXD2 applied to the terminal IN is low, the electronic switch 2202 is closed and the terminal OUT is short-circuited to ground. Conversely, when the signal TXD2 applied to the terminal IN is high, the electronic switch 2202 is opened and the terminal OUT is floating. For example, when the electronic switch is a FET, the driver circuit 220 is usually called open drain driver circuit, because the drain terminal may remain opened.

Accordingly, as shown in FIG. 7, by connecting a pull-up resistor R to the node TX2, e.g., between a supply voltage Vdd of the processing system 10a and the node TX2, a driver circuit 220 may pull the voltage at the node TX2 to ground. Generally, the resistor R may be integrated within the integrated circuit 30a or may be connected externally to the terminal/pad TX2.

In various embodiments, the reception signal $RXD2_1 \ldots RXD2_n$ are connected to a reception node RX2 of the bus system 22.

In case of an internal bus 22 (similar to FIG. 6), the node RX2 may be connected (e.g., directly) to the node TX2.

Conversely, in case the bus 22 may also be used to connect the processing units of the integrated circuit 30a to another integrated circuit, the node RX2 may be connected to a pad of the integrated circuit 30a. Specifically, as will be described in greater detail in the following, the signal at the node TX2 may already be used for a bi-directional single wire communication (due to a feedback via a node RX2 connected to the node TX2), or the signals at the nodes TX2 and RX2 may be used for a unidirectional two-wire communication. Accordingly, in order to permit the communication with another integrated circuit, the node RX2 may be connected either to the node TX2 or to a pad of the integrated circuit 30a.

In various embodiments, in order to permit a configurability of the integrated circuit 30a, the processing system 10a/integrated circuit 30a may comprise a switching circuit configured to:
selectively connect the node RX2 to the node TX2;
selectively connect the node TX2 to a terminal of the processing system 10a/pad of the integrated circuit 30a; and
optionally, selectively connect the node RX2 to a terminal of the processing system 10a/pad of the integrated circuit 30a.

For example, in various embodiments, the processing system 10a/integrated circuit 30a may comprise:
an electronic switch 224 connected between the nodes TX2 and RX2, wherein the electronic switch 224 is driven by a control signal CTR2; and/or
a crossbar 24 configured to selectively connect the nodes TX2 and/or RX2 to terminals of the processing system 10a/pads of the integrated circuit 30a, wherein the crossbar 24 is driven by one or more control signals CTR3.

Generally, the control signals CTR2 and/or CTR3 may be hardwired (fixed), or programmable, e.g., via configuration data set during the production of the integrated circuit 30a and/or via software instructions executed by the processing unit 104.

Accordingly, in the embodiments considered so far, the signals $TXD2_1 \ldots TXD2_n$ are connected to a single bus 22. However, in general, the processing system 10a may also comprise a plurality of buses 22 and each signal $TXD2_1 \ldots TXD2_n$ may be connected to a respective bus 22. For example, for this purpose, each signal $TXD2_1 \ldots TXD2_n$ may be connected to a respective node, which is connected to a respective pad of the IC 30a, or to one of a plurality of buses 22 within the same IC 30a.

Figure 9:
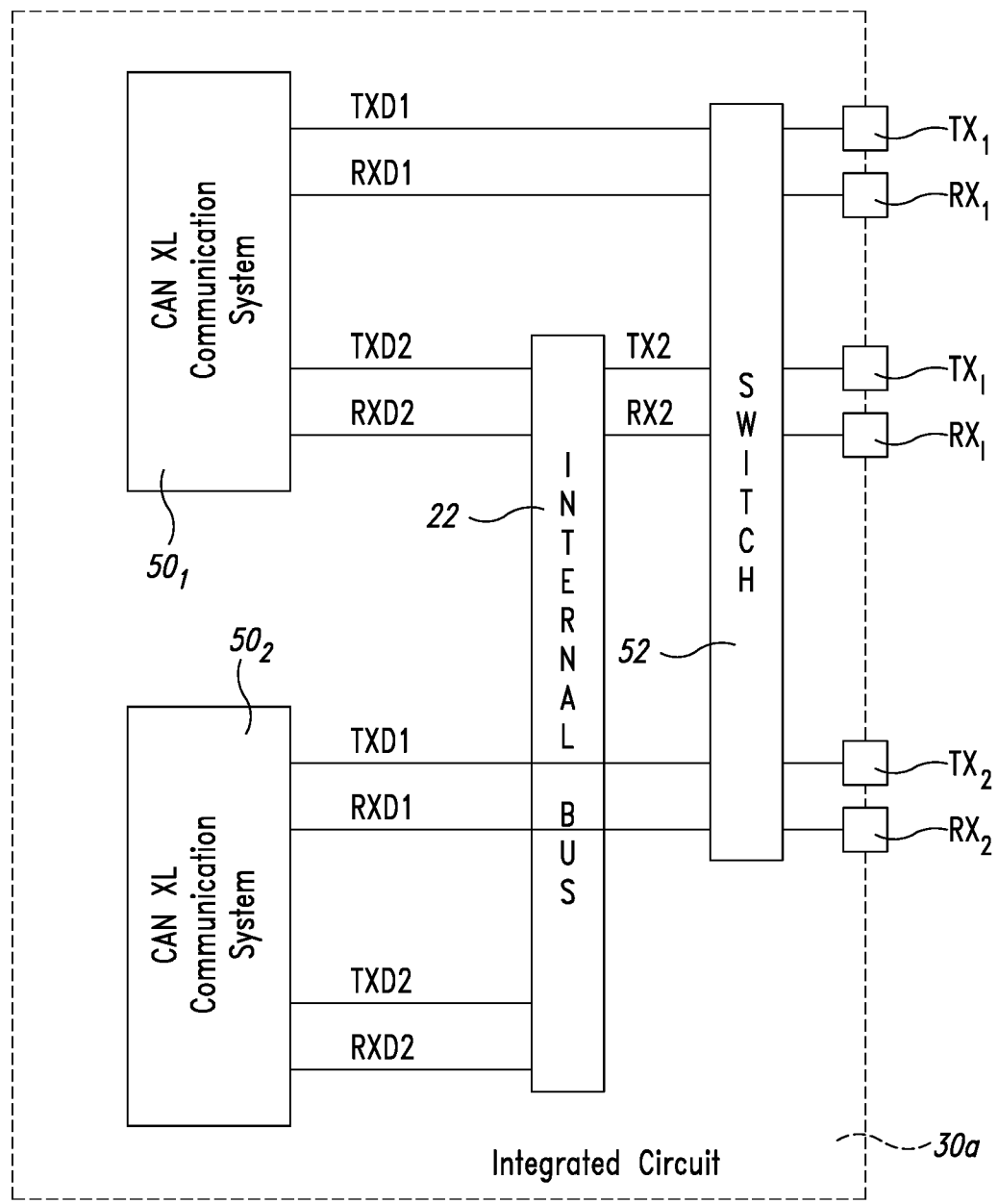
FIG. 9 shows an embodiment of a processing system according to the present disclosure.

FIG. 9 shows an embodiment of an integrated circuit 30a adapted to be used in a processing system 10a, such as a processing system of a vehicle.

Specifically, in the embodiment considered, the integrated circuit 30a comprises a plurality of CAN XL communication systems 50. Specifically, each of the CAN XL communication systems 50 has the architecture shown in FIG. 5 and is configured to generate respective transmission signals TXD1 and TXD2 and receive respective reception signals RXD1 and RXD2. Accordingly, each CAN XL communication system 50 comprises a CAN XL protocol controller 300 (e.g., implemented with a programmable processing unit 104 and/or an interface IF), a PWM generator 302 and selector circuits 304 and 306. For example, in the embodiment considered, two CAN XL communication systems $50_1$ and $50_2$ are shown, but any greater number may be used.

In the embodiment considered, the signals TXD2 and RXD2 of the various CAN XL communication systems 50 are connected to an internal bus 22 of the integrated circuit 30a.

As mentioned before, in various embodiments, the nodes TX2 and RX2 may be connected to pads of the integrated circuit 30a. For example, in FIG. 9 are shown respective pads $TX_I$ and $RX_I$. Specifically, as described in the foregoing, in order to permit different configurations, the nodes TX2 and RX2 may be connected selectively to the pads $TX_I$ and $RX_I$ via a switching circuit, indicated in FIG. 9 with the reference sign 52, such as a crossbar. Optionally, the switching circuit 52 may be configured to short-circuit the nodes TX2 and RX2. Generally, this function is purely optional, because the pads $TX_I$ and $RX_I$ could also be short-circuited externally (if required). Accordingly, the switching circuit 52 may comprise the blocks 224 and 24 shown in FIG. 7.

As described in the foregoing, the signals TXD1 and RXD1 may be connected to respective pads TX and RX. For example, the signals TXD1 and RXD1 of the CAN XL communication system $50_1$ may be connected to pads $TX_1$ and $RX_1$, and the signals TXD1 and RXD1 of the CAN XL communication system $50_2$ may be connected to pads $TX_2$ and $RX_2$. However, similar to the nodes TX2 and RX2, in various embodiments, also the signals TXD1 and RXD1 may be provided to the switching circuit 52, which, e.g., may be useful in case given signals are not connected to another integrated circuit and/or in order to change the association between the signals and the pads. Accordingly, the switching circuit 52, such as a crossbar, may also be configured to selectively connect one or more of the signals TXD1 and RXD1 to respective pads TX and RX. Generally, (at least part of) the switching circuit 52 may also be implemented via a hard-wiring. For example, the signals may be connected to respective pads of the integrated circuit 30a, but these pads may be connected selectively, e.g., via wire bonding, to the pins of a respective IC package. For example, in this way, the producer of the IC 30a may decide a fixed configuration of the integrated circuit.

FIGS. 10 to 13 show various embodiments of processing systems 10a, which use the integrated circuit 30a of FIG. 9.

Figure 10:
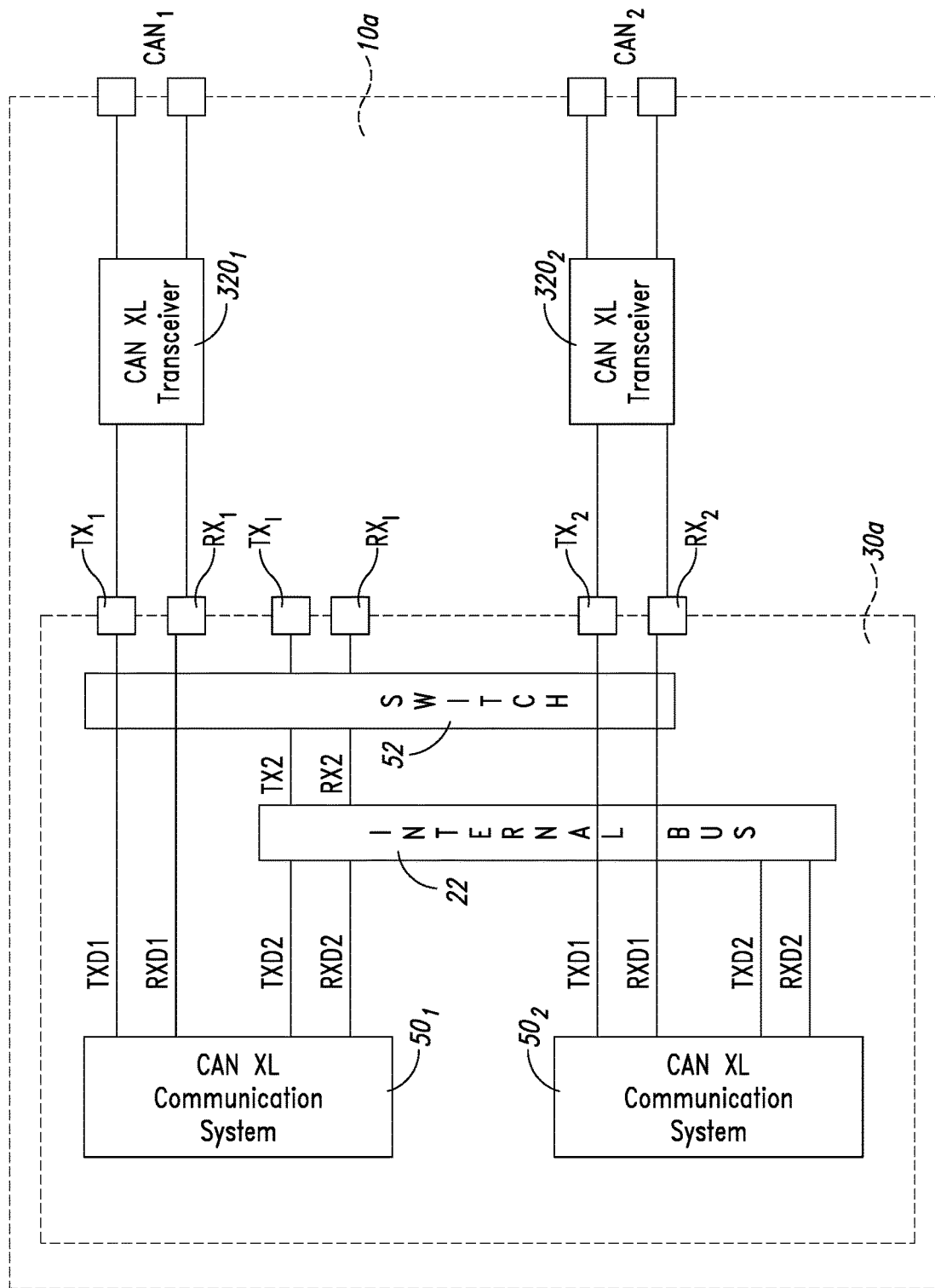
FIGS. 10 to 15 show embodiments of configurations and/or operation modes of the processing system of FIG. 9.

Specifically, in FIG. 10, the signals TXD1 and RXD1 of the CAN XL communication system $50_1$ are connected to a first CAN XL transceiver 3201, e.g., by connecting the signals TXD1 and RXD1 of the CAN XL communication system $50_1$ to pads $TX_1$ and $RX_1$ and connecting these pads to an IC 32 comprising the CAN XL transceiver 3201. Similarly, the signals TXD1 and RXD1 of the CAN XL communication system $50_2$ are connected to a second CAN XL transceiver 3202, e.g., by connecting the signals TXD1 and RXD1 of the CAN XL communication system $50_2$ to pads $TX_2$ and $RX_2$ and connecting these pads to an IC 32 comprising the CAN XL transceiver 3202. Generally, the CAN XL transceiver 3201 and 3202 may be integrated in the same integrated circuit 32 or two separate integrated circuits 32. Accordingly, in the embodiment considered, the CAN XL transceiver 3201 (terminals CANH and CANL) may be connected to terminals of the processing system 10a, which in turn are connected to a first CAN bus $CAN_1$, and the CAN XL transceiver 3202 (terminals CANH and CANL) may be connected to terminals of the processing system 10a, which in turn are connected to a second CAN bus $CAN_2$. Generally, the bus $CAN_2$ may also correspond to the bus $CAN_1$.

Accordingly, in the embodiment considered, the internal bus 22 is not used. Accordingly, the CAN XL protocol controllers 300 of the circuits 50 are configured to receive the signal RXD1 (see the description of selector 306 of FIG. 5). Moreover, in this case, the nodes TX2 and RX2 may not be connected to respective pads $TX_I$ and $RX_I$. Optionally, the signal TXD may not be provided as signal TXD2 to the internal bus 22 (see the description of the optional switch 308 of FIG. 5).

Accordingly, FIG. 10 shows a scenario, wherein the integrated circuit 30a is used according to the CAN XL standard, each CAN XL protocol controller 300 uses a respective CAN XL transceiver 320.

Figure 11:
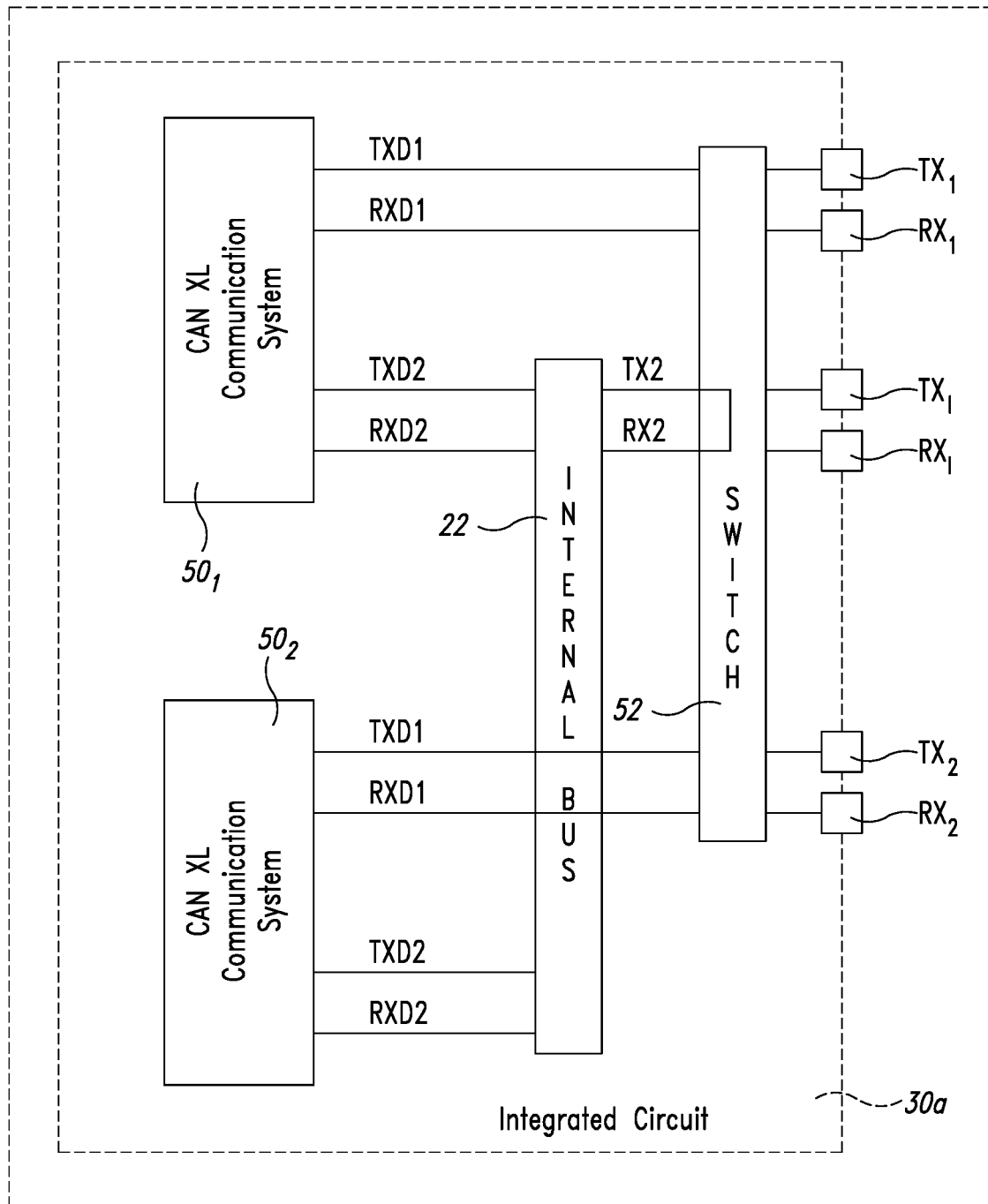

Conversely, FIG. 11 shows an embodiment, wherein the circuits $50_1$ and $50_2$ communicate via the (internal) bus 22. Specifically, in the embodiment considered, the node TX2 is connected to the node RX2, e.g.:

via the switching circuit 52; or
by connecting the nodes TX2 and RX2 to the pads $TX_I$ and $RX_I$, and connecting (externally) the pad $TX_1$ to the pad $RX_1$.

In the embodiment considered, the signals TXD1 and RXD1 are not used, and the transceivers 320 may be omitted. In this case, the PWM generator 302 may also be disabled. Accordingly, the CAN XL protocol controllers 300 of the circuits 50 are configured to receive the signal RXD2 (see the description of selector 306 of FIG. 5). Generally, in this case, the signal TXD is provided as signal TXD2 to the internal bus 22 (see the description of the optional switch 308 of FIG. 5). Moreover, the signals TXD1 and RXD1 may not be connected to respective pads TX and RX.

Figure 12:
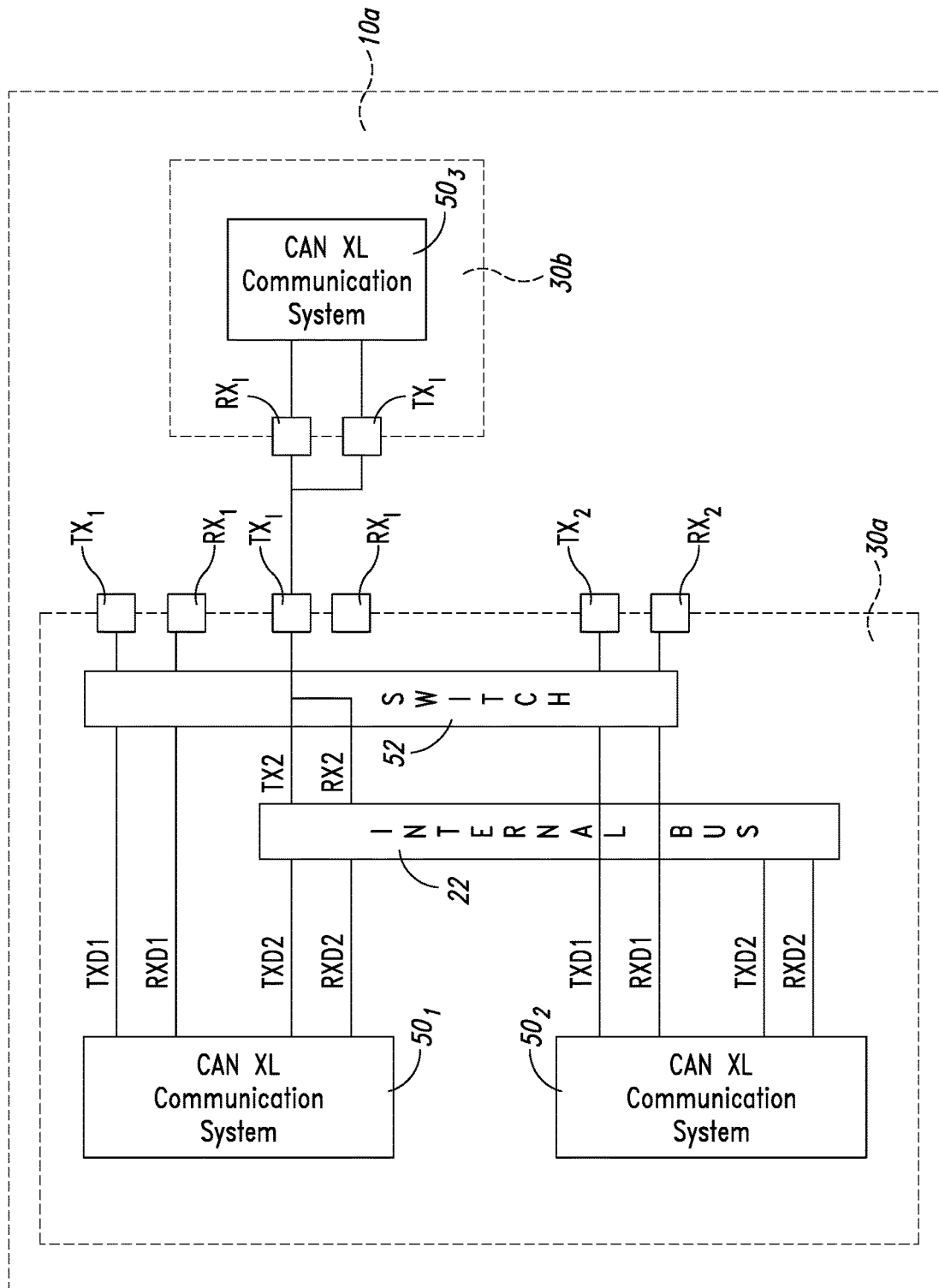

FIG. 12 shows a modified embodiment, wherein the processing system 10a comprises in addition to the integrated circuit 30a also a further integrated circuit 30b comprising at least a further CAN XL communication system $50_3$. For example, in the embodiment considered, the integrated circuits 30a and 30b may be mounted on the same printed circuit board.

Specifically, in the embodiment considered, the node RX2 is again connected to the node TX2, but the node TX2 is now connected to the CAN XL communication system $50_3$. For example, for this purpose, the switching circuit 52 may be configured to connect the node TX2 to the pad $TX_I$. Moreover, also the node TX2 may be connected to the node RX2 in the integrated circuit 30b, as schematically shown via a short circuit between the pads $TX_I$ and $RX_I$ of the integrated circuit 30b.

Accordingly, in the embodiment considered, the CAN XL communication system $50_3$ is connected (via a bi-directional single-wire communication) to the internal bus 22.

Figure 13:
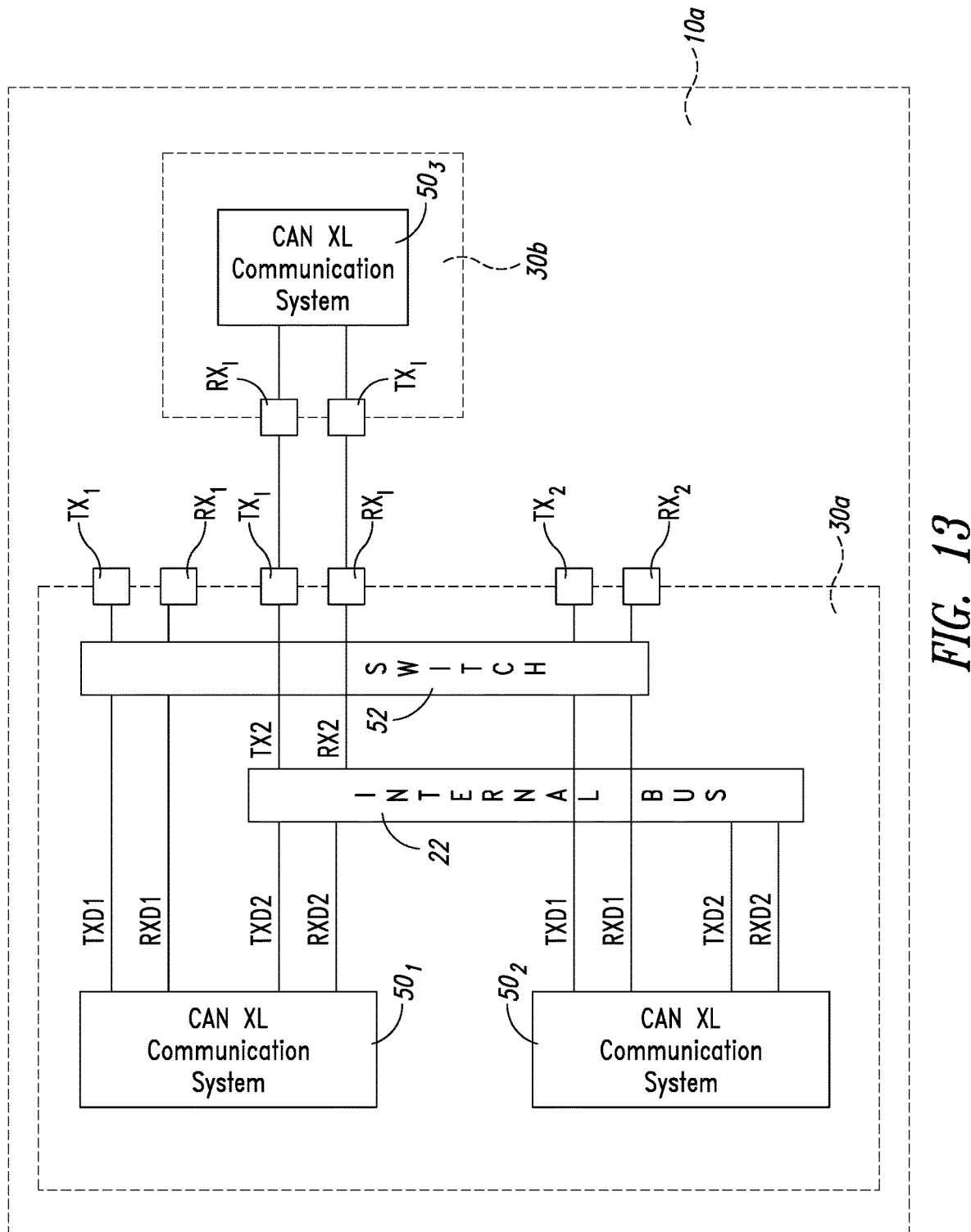

FIG. 13 shows a slightly modified embodiment, wherein the nodes TX2 and RX2 are not short-circuited, but the node TX2 of the integrated circuit 30a is connected to the node RX2 of the integrated circuit 30b, and the node RX2 of the integrated circuit 30a is connected to the node TX2 of the integrated circuit 30b. Accordingly, in this case, a full-duplex bi-direction two-wire communication may be used. For example, in this case, the node TX2 may be connected via the switching circuit 52 to the pad $TX_I$, which in turn is connected to the pad $RX_I$ of the integrated circuit 30b, and the node RX2 may be connected via the switching circuit 52 to the pad $RX_I$, which in turn is connected to the pad $TX_I$ of the integrated circuit 30b.

Those of skill in the art will appreciate that the configuration shown in FIG. 13 does not correspond to a standard mode of operation of a CAN XL controller 300. However, such mode may be used to implement a bidirectional two-wire communication protocol for the signals TXD and RXD, such as an Universal asynchronous receiver-transmitter (UART) protocol.

Figure 14:
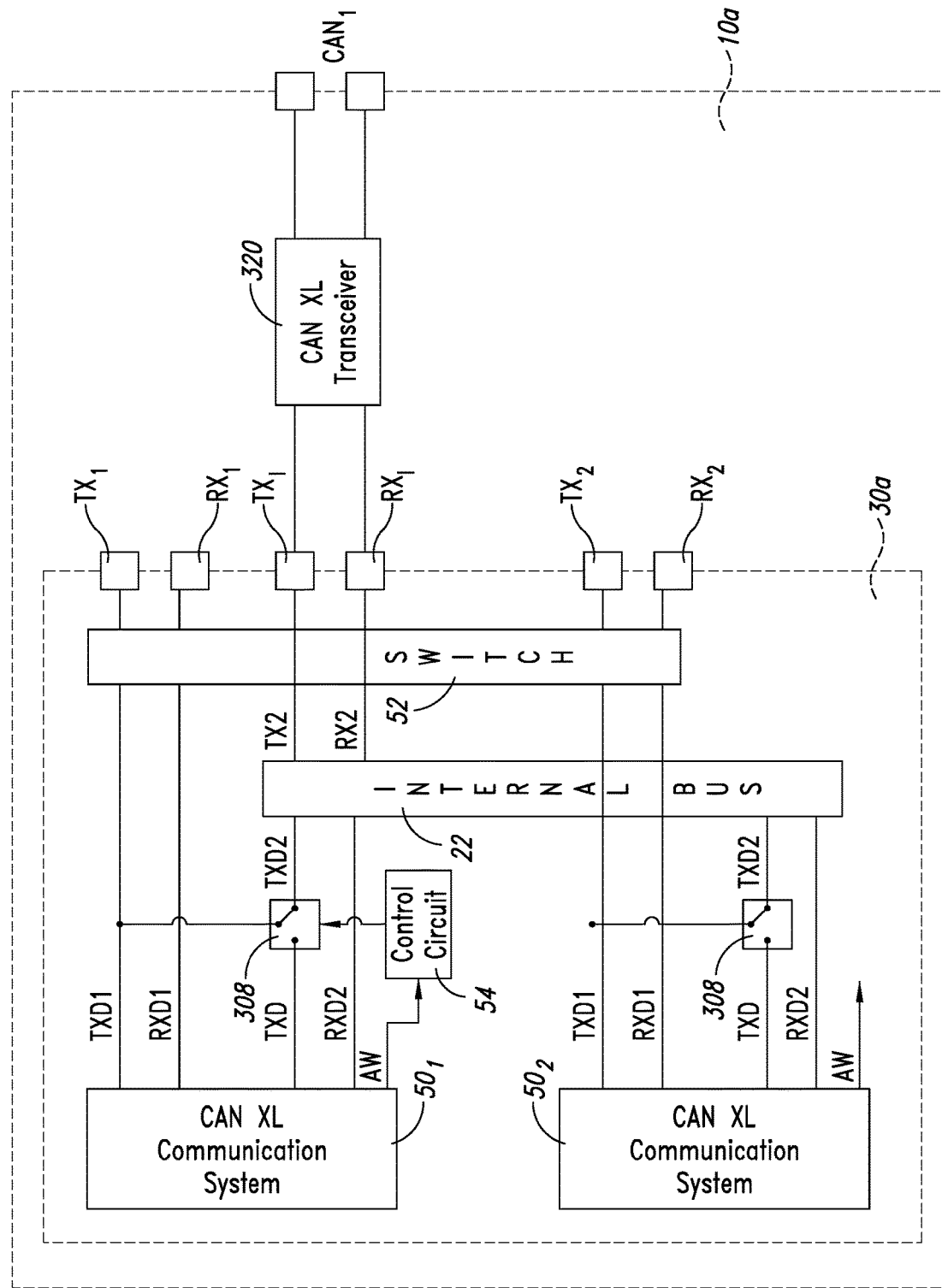

FIG. 14 shows a further embodiment of a processing system 10a/integrated circuit 30a. Specifically, in the embodiment considered, the electronic switch 308 shown in FIG. 5, is replaced with a selector configured to select for the respective CAN XL communication system 50 as signal TXD2:

the signal TXD (as described with respect to FIG. 5);
the signal TXD1 or directly the PWM signal generated by the respective PWM generator 302; or
optionally a fixed logic level "high".

Moreover, in the embodiment considered, the integrated circuit 30a comprises a control circuit 54 configured to generate control signals in order to drive the selectors 308 associated with the CAN XL communication systems 50.

Accordingly, in the embodiment considered, the signal TX2 of the bus 22 may also comprise PWM encoded data. For this reason, the node RX2 is not connected to the node TX2, because the CAN XL communication system 50 would be unable to understand the signal TXD1. Conversely, the nodes TX2 and RX2 are connected to an internal or external CAN XL transceiver 320. For example, in the embodiment considered, the nodes TX2 and RX2 are connected to pads $TX_I$ and $RX_I$, which in turn are connected to the pads of an external CAN XL transceiver 320. For example, the terminals CANH and CANL of the transceiver 320 may be used to connect the processing system 10a to a CAN bus $CAN_I$.

Specifically, in the embodiment considered, during an arbitration phase, the control circuit 54 is configured to drive the selectors 308, such that the signals TXD generated by the various CAN XL communication systems 50 are provided as signals TXD2 to the bus 22. Accordingly, one or more of the CAN XL communication systems 50 may start a communication by setting the respective signal TXD according to the CAN XL arbitration protocol, e.g., by using the (low-speed) NRZ encoding of the signal TXD, wherein the (combined) signal TX2 of the bus 22 is provided to the transceiver 320.

Based on the arbitration, each CAN XL communication system 50 may thus determine whether the bus 22 and the CAN bus $CAN_1$ is free for transmitting data, e.g., by monitoring whether the data received via the respective reception signal RXD2 correspond to the (low-speed arbitration) data transmitted by the respective CAN XL communication systems 50. Specifically, in the embodiment considered, each of the CAN XL communication systems 50 is configured to set a signal AW, which indicates whether the respective CAN XL communication system 50 has determined that the CAN XL communication system 50 may transmit data.

In the embodiment considered, the signals AW generated by the CAN XL communication systems 50 are provided to the control circuit 54. Specifically, in various embodiments, once a signal AW is set, the control circuit 54 is configured to start a transmission phase, wherein the control circuit 54 drive the selectors 308, such that:

for the CAN XL communication system 50 having set the signal AW, the respective signal TXD1 (or the respective PWM signal generated by the PWM generator 302) is provided as signals TXD2 to the bus 22; and
for the (other) CAN XL communication system 50 having not set the signal AW, the respective signal TXD2 is set to the signal TXD (which should remain high) or directly to the logic level high.

Accordingly, in this case, only the (high-speed) PWM encoded signal of the CAN XL communication system 50 having set the signal AW is provided to the transceiver 320 and thus transmitted via the CAN bus $CAN_1$.

In general, also none of the CAN XL communication systems 50 may set the respective signal AW, e.g., because the CAN bus $CAN_1$ is busy. However, in this case, the CAN XL standard prescribes that the CAN controller should transmit in any case a PWM modulated sequence, in order to indicate that the transceiver 320 should return to the reception phase.

Accordingly, in various embodiments, the control circuit 54 may be configured to:

monitor the signals TXD in order to determine the CAN XL communication systems 50 having transmitted data during the arbitration phase;
monitor the signals AW, and verify whether none of the communication systems 50 has set the respective signal AW;
in response to determining that none of the communication systems 50 has set the respective signal AW, select one of the CAN XL communication systems 50 having transmitted data during the arbitration phase;
for the selected CAN XL communication system 50, use during the transmission phase as signal TXD2 the respective signal TXD1 (or the respective PWM signal generated by the PWM generator 302); and
for the other CAN XL communication system 50, set the respective signal TXD2 to high.

Accordingly, in this way, a single CAN XL transceiver is sufficient in order to connect a plurality of CAN XL communication systems 50 of the same processing system 10 to a common CAN XL bus.

Figure 15:
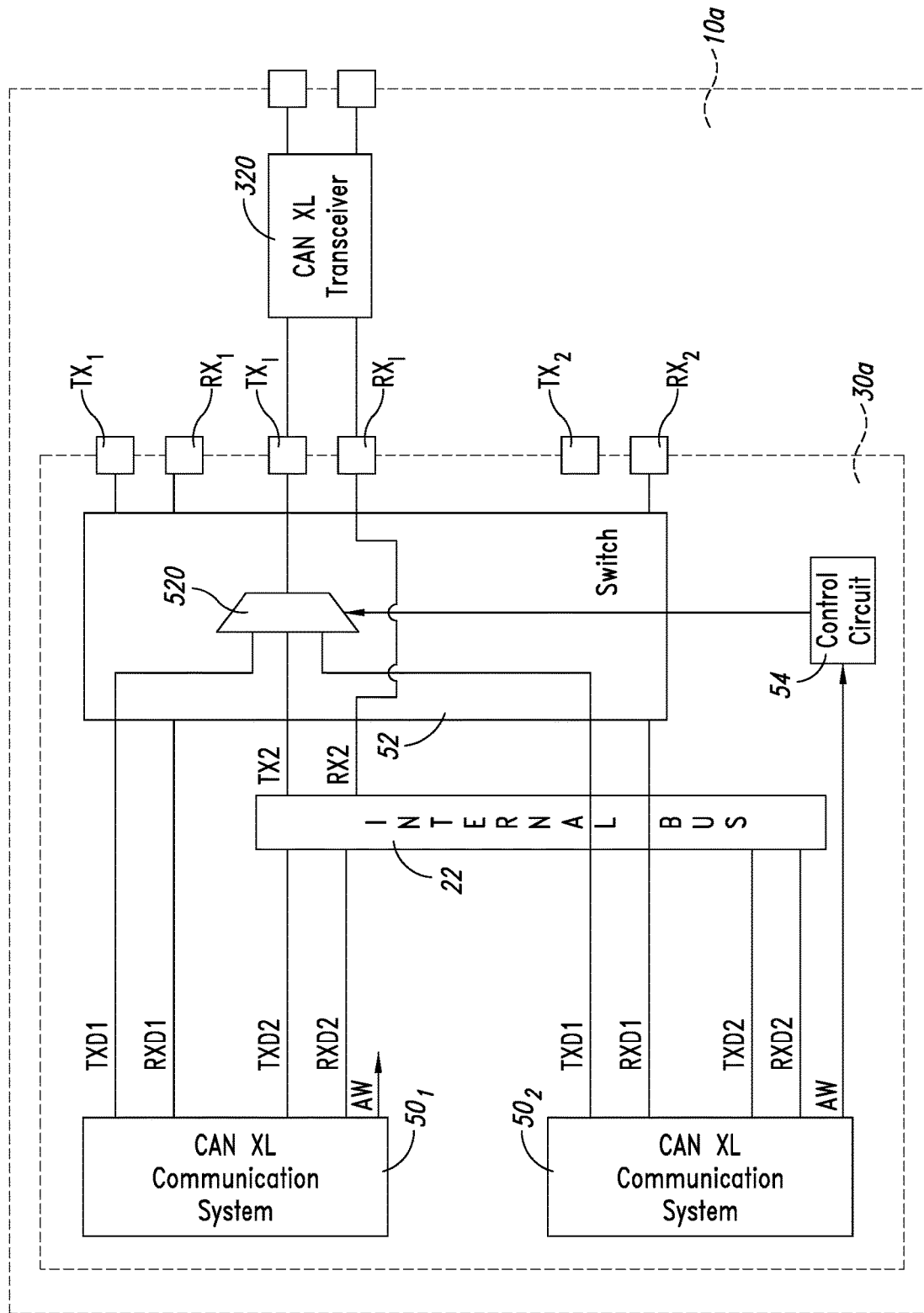

FIG. 15 shows an alternative embodiment of the arrangement of FIG. 14. Specifically, instead of routing the PWM modulated circuit through the bus 22, an additional multiplexer 520 is added in the switching circuit 52. Specifically, this multiplexer 520 is configured to provide to the pin $TX_I$ either:

the signal TX2 provided by the bus 22; or
one of the signals TXD1 (or the respective PWM signal generated by the PWM generator 302).

Specifically, also in this case, during an arbitration phase, the bus 22 receives the various signals TXD2 generated by the various CAN XL communication systems 50. Moreover, the control circuit 54 drives the multiplexer in order to provide the signal TX2 (provided by the bus 22) to the terminal TX$_I$.

Accordingly, one or more of the CAN XL communication systems 50 may start a communication by setting the respective signal TXD/TXD2 according to the CAN XL arbitration protocol, e.g., by using the (low-speed) NRZ encoding of the signal TXD, wherein the (combined) signal TX2 of the bus 22 is provided to the transceiver 320.

Based on the arbitration, each CAN XL communication system 50 may thus determine whether the bus 22 and the CAN bus CAN$_1$ is free for transmitting data. Accordingly, also in this case, each CAN XL communication systems 50 is configured to set a signal AW, which indicates whether the respective CAN XL communication system 50 has determined that the CAN XL communication system 50 may transmit data. In the embodiment considered, the signals AW generated by the CAN XL communication systems 50 are provided to the control circuit 54. Specifically, in various embodiments, once a signal AW is set, the control circuit 54 is configured to start a transmission phase, wherein the control circuit 54 drives the multiplexer 520 in order to provide to the terminal TX$_I$ the signal TXD1 (or the respective PWM signal generated by the PWM generator 302) of the CAN XL communication system 50 having set the signal AW. Accordingly, in this case, only the (high-speed) PWM encoded signal of the CAN XL communication system 50 having set the signal AW is provided to the transceiver 320 and thus transmitted via the CAN bus CAN$_1$.

Specifically, also in order to cover the case that the bus is busy, in various embodiments, the control circuit 54 may be configured to:

monitor the signals TXD in order to determine the CAN XL communication systems 50 having transmitted data during the arbitration phase;

monitor the signals AW, and verify whether none of the communication systems 50 has set the respective signal AW;

in response to determining that none of the communication systems 50 has set the respective signal AW, select one of the CAN XL communication systems 50 having transmitted data during the arbitration phase; and drive the multiplexer 520 in order to provide, during the transmission phase, the signal TXD1 (or the respective PWM signal generated by the PWM generator 302) of the selected CAN XL communication systems 50 to the terminal TX$_I$.

Generally, the integrated circuit 30a may also be configured to switch, in run-time, between the various modes. For example, during a first time-period the integrated circuit 30a may be configured as shown in FIG. 11, and during a second time-period as shown in FIG. 10.

Of course, without prejudice to the principle of the disclosure, the details of construction and the embodiments may vary widely with respect to what has been described and illustrated herein purely by way of example, without thereby departing from the scope of the present disclosure.

A processing system (10a) may be summarized as including a first CAN XL communication system (50$_1$) and a second CAN XL communication system (50$_2$), wherein each of said first and said second CAN XL communication system (50$_1$, 50$_2$) includes a CAN XL protocol controller (300) configured to generate a NRZ encoded transmission signal (TXD) wherein the NRZ encoded transmission signal (TXD) has a first bit rate in a high-speed mode and second bit rate in a low speed mode, and wherein said CAN XL protocol controller (300) is configured to receive a NRZ encoded reception signal (RXD), a Pulse-Width Modulated, PWM, signal generator circuit (302) configured to, when said NRZ encoded transmission signal (TXD) has said first bit rate, generate a PWM signal having a first duty cycle when said NRZ encoded transmission signal (TXD) is set to high and a second duty cycle when said NRZ encoded transmission signal (TXD) is set to low, and a selector circuit (304) configured to generate a first transmission signal (TXD1) by selecting a) said NRZ encoded transmission signal (TXD) when said NRZ encoded transmission signal (TXD) has said second bit rate, and b) said PWM signal when said NRZ encoded transmission signal (TXD) has said first bit rate; wherein said processing system (10a) includes a bus (22) having a transmission node (TX2) and a reception node (RX2), wherein said bus (22) is configured to receive from each of said first and said second CAN XL communication system (50$_1$, 50$_2$) a respective second transmission signal (TXD2) and drive the logic level at said transmission node (TX2) as a function of the logic levels of said second transmission signals (TXD2), and provide to each of said first and said second CAN XL communication system (50$_1$, 50$_2$) a respective second reception signal (RXD2) having a logic level determined as a function of the logic level at said reception node (RX2); and a switching circuit (24, 224, 306, 308, 52, 520) configured to support a plurality of modes, wherein, in a first mode, said switching circuit (24, 224, 306, 308, 52, 520) is configured to provide said NRZ encoded transmission signals (TXD) of said first and said second CAN XL communication systems (50$_1$, 50$_2$) as said second transmission signals (TXD2) to said bus system (22), and provide the respective second reception signal (RXD2) received from said bus (22) to the CAN XL protocol controllers (300) of said first and said second CAN XL communication system (50$_1$, 50$_2$).

Said processing system (10a) may include a first transmission terminal (TX$_1$) and a first reception terminal (RX$_1$) configured to be connected to a CAN XL transceiver (320), and, in a second mode, said switching circuit (24, 224, 306, 308, 52, 520) may be configured to provide said first transmission signal (TXD1) of said first CAN XL communication system (50$_1$) to said first transmission terminal (TX$_1$), and provide the signal (RXD1) at said first reception terminal (RX$_1$) to the CAN XL protocol controller (300) of said first CAN XL communication system (50$_1$).

In said first mode, said transmission node (TX2) of said bus (22) may be connected to said reception node (RX2) of said bus (22).

Said processing system (10a) may include a second transmission terminal (TX$_I$), and, in said first mode, said second transmission terminal (TX$_I$) may be configured to be connected to a third CAN XL communication system (50$_3$) and said transmission node (TX2) of said bus (22) may be connected to said second transmission terminal (TX$_I$).

Said switching circuit (24, 224, 306, 308, 52, 520) may be configured to selectively connect said transmission node (TX2) of said bus (22) to said reception node (RX2) of said bus (22); and/or said transmission node (TX2) of said bus (22) to said second transmission terminal (TX$_I$).

Each CAN XL protocol controller (300) may be configured to during an arbitration phase, generate the respective NRZ encoded transmission signal (TXD) with said second bit rate, determine whether the respective NRZ encoded reception signal (RXD) indicates that said CAN XL protocol controller (300) may transmit data, and in response to determining that said CAN XL protocol controller (300) may transmit data, during a data transmission phase, set a control signal (AW) and generate the respective NRZ encoded transmission signal (TXD) with said first bit rate.

Said processing system (10a) may include a second transmission terminal ($TX_t$) and a second reception terminal ($RX_t$), and wherein, in a third mode, said second transmission terminal ($TX_t$) and said second reception terminal ($RX_t$) may be configured to be connected to a CAN XL transceiver (320) and said switching circuit (24, 224, 306, 308, 52, 520) may be configured to during a first phase provide said NRZ encoded transmission signals (TXD) of said first and said second CAN XL communication systems ($50_1$, $50_2$) as said second transmission signals (TXD2) to said bus system (22), provide the signal at said transmission node (TX2) of said bus (22) to said second transmission terminal ($TX_t$), and provide the signal at said second reception terminal ($RX_t$) to said reception node (RX2) of said bus (22), and provide the respective second reception signal (RXD2) received from said bus (22) to the CAN XL protocol controllers (300) of said first and said second CAN XL communication system ($50_1$, $50_2$); during a second phase verify whether one of said control signals (AW) generated by said CAN XL protocol controller (300) may be set, and in response to determining that one of said control signals (AW) may be set, provide (308; 520) the first transmission signal (TXD1) or the PWM signal of the respective CAN XL communication system ($50_1$) to said second transmission terminal ($TX_t$).

Said bus (22) may include at least one logic gate configured to generate the signal at said transmission node (TX2) via a logic AND combination of said second transmission signals (TXD2); or a first and a second open-drain driver circuit (220), wherein an input (IN) of said first open-drain driver may be connected to said second transmission signal (TXD2) of said first CAN XL communication system ($50_1$), an input (IN) of said second open-drain driver may be connected to said second transmission signal (TXD2) of said second CAN XL communication system ($50_1$), and outputs (OUT) of said first and said second open-drain driver circuit (220) may be connected to said transmission node (TX2).

An integrated circuit may be summarized as including a processing system as disclosed herein.

A device, such as a vehicle, may be summarized as including a plurality of processing systems (10), wherein at least one of said processing systems (10) is according to the processing system as disclosed herein.

A method of operating a processing system may be summarized as including the steps of provide the NRZ encoded transmission signals (TXD) of said first and said second CAN XL communication systems ($50_1$, $50_2$) as said second transmission signals (TXD2) to said bus system (22), and provide the respective second reception signal (RXD2) received from said bus (22) to the CAN XL protocol controllers (300) of said first and said second CAN XL communication system ($50_1$, $50_2$).

In an embodiment, a processing system comprises: a first controller area network data link layer protocol, CAN XL, communication system and a second CAN XL communication system, the first and second CAN XL communication systems each including: a CAN XL protocol controller, which, in operation: generates a non-return-to-zero, NRZ, encoded transmission signal, wherein the NRZ encoded transmission signal (TXD) has a first bit rate in a high-speed mode and second bit rate in a low speed mode; and receives a NRZ encoded reception signal; a Pulse-Width Modulated, PWM, signal generator circuit, which, in operation, when said NRZ encoded transmission signal has said first bit rate, generates a PWM signal having a first duty cycle when said NRZ encoded transmission signal is set to high and a second duty cycle when said NRZ encoded transmission signal is set to low; and a selector circuit, which, in operation, generates a first transmission signal by selecting: said NRZ encoded transmission signal when said NRZ encoded transmission signal has said second bit rate; and said PWM signal when said NRZ encoded transmission signal has said first bit rate; a bus having a transmission node and a reception node, wherein the bus, in operation: receives from each of said first and said second CAN XL communication systems a respective second transmission signal and drives a logic level at said transmission node as a function of logic levels of the second transmission signals (TXD2); and provides to each of said first and said second CAN XL communication systems a respective second reception signal having a logic level based on a logic level at said reception node; and a switching circuit, which, in operation, supports a plurality of switching modes, wherein, in a first switching mode, said switching circuit, in operation: provides said NRZ encoded transmission signals of said first and said second CAN XL communication systems as said second transmission signals to said bus; and provides the respective second reception signal received from said bus to the CAN XL protocol controllers of said first and said second CAN XL communication systems. In an embodiment, the processing system comprises a first transmission terminal and a first reception terminal configured to couple to a CAN XL transceiver. In a second switching mode, the switching circuit, in operation: provides the first transmission signal of the first CAN XL communication system to the first transmission terminal; and provides the signal at the first reception terminal to the CAN XL protocol controller of the first CAN XL communication system. In an embodiment, in the first switching mode, the transmission node of the bus is coupled to the reception node of the bus. In an embodiment, the processing system comprises a second transmission terminal, and wherein, in the first switching mode, the second transmission terminal is configured to couple to a third CAN XL communication system and the transmission node of the bus is coupled to the second transmission terminal.

In an embodiment, the switching circuit, in operation, selectively connects: the transmission node of the bus to the reception node of the bus; the transmission node of the bus to the second transmission terminal; or the transmission node of the bus to the reception node of the bus and to the second transmission terminal. In an embodiment, each CAN XL protocol controller, in operation: during an arbitration phase, generates the respective NRZ encoded transmission signal with the second bit rate; determines whether the respective NRZ encoded reception signal indicates that the CAN XL protocol controller may transmit data; and in response to determining that the CAN XL protocol controller may transmit data, during a data transmission phase, sets a control signal and generates the respective NRZ encoded transmission signal with the first bit rate. In an embodiment, the processing system comprises a second transmission terminal and a second reception terminal, and in a third switching mode, the second transmission terminal and the second reception terminal are coupled to a CAN XL transceiver. The switching circuit, in operation during a first phase: provides the NRZ encoded transmission signals of the first and the second CAN XL communication systems as the second transmission signals to the bus system; provides the signal at the transmission node of the bus to the second transmission terminal, and provides the signal at the second reception terminal to the reception node of the bus; and provides the respective second reception signal received from the bus to the CAN XL protocol controllers of the first and the second CAN XL communication system. During a second phase the switching circuit: determines whether one of the control signals generated by the CAN XL protocol controller is set; and in response to determining that one of the control signals is set, provides the first transmission signal or the PWM signal of the respective CAN XL communication system to the second transmission terminal.

In an embodiment, the bus comprises: at least one logic gate, which, in operation, generates the signal at the transmission node as a logic AND combination of the second transmission signals; or a first and a second open-drain driver circuit, wherein an input of the first open-drain driver is coupled to the second transmission signal of the first CAN XL communication system, an input of the second open-drain driver is coupled to the second transmission signal of the second CAN XL communication system, and outputs of the first and the second open-drain driver circuits are coupled to the transmission node. In an embodiment, the processing system comprises an integrated circuit including the first and second CAN XL communication systems, the bus and the switching circuit.

In an embodiment, a system comprises: a first processing device; and a second processing device coupled to the first processing device. The second processing device includes at least two controller area network data link layer protocol, CAN XL, communication systems. Each CAN XL communication system includes: a CAN XL protocol controller, which, in operation: generates a non-return-to-zero, NRZ, encoded transmission signal, wherein the NRZ encoded transmission signal (TXD) has a first bit rate in a high-speed mode and second bit rate in a low speed mode; and receives a NRZ encoded reception signal; a Pulse-Width Modulated, PWM, signal generator circuit, which, in operation, when said NRZ encoded transmission signal has said first bit rate, generates a PWM signal having a first duty cycle when said NRZ encoded transmission signal is set to high and a second duty cycle when said NRZ encoded transmission signal is set to low; and a selector circuit, which, in operation, generates a first transmission signal by selecting: said NRZ encoded transmission signal when said NRZ encoded transmission signal has said second bit rate; and said PWM signal when said NRZ encoded transmission signal has said first bit rate. The system includes a bus having a transmission node and a reception node, wherein the bus, in operation: receives from each of said first and said second CAN XL communication systems a respective second transmission signal and drives a logic level at said transmission node as a function of logic levels of the second transmission signals (TXD2); and provides to each of said first and said second CAN XL communication systems a respective second reception signal having a logic level based on a logic level at said reception node. The system includes a switching circuit, which, in operation, supports a plurality of switching modes, wherein, in a first switching mode, said switching circuit, in operation: provides said NRZ encoded transmission signals of said first and said second CAN XL communication systems as said second transmission signals to said bus; and provides the respective second reception signal received from said bus to the CAN XL protocol controllers of said first and said second CAN XL communication systems. In an embodiment, the first and second processing devices, in operation, generate control signals associated with a vehicle.

In an embodiment, the system comprises: a CAN XL transceiver, wherein the second processing device comprises a first transmission terminal and a first reception terminal coupled to the CAN XL transceiver, and, in a second switching mode, the switching circuit, in operation: provides the first transmission signal of the first CAN XL communication system to the first transmission terminal; and provides the signal at the first reception terminal to the CAN XL protocol controller of one or more of the at least two CAN XL communication systems. In an embodiment, in the first switching mode, the transmission node of the bus is coupled to the reception node of the bus. In an embodiment, the second processing device comprises a second transmission terminal, and in the first switching mode, the second transmission terminal is configured to couple to a CAN XL communication system of the at least two CAN XL communication systems and the transmission node of the bus is coupled to the second transmission terminal. In an embodiment, the switching circuit, in operation, selectively connects: the transmission node of the bus to the reception node of the bus; the transmission node of the bus to the second transmission terminal; or the transmission node of the bus to the reception node of the bus and to the second transmission terminal. In an embodiment, each CAN XL protocol controller, in operation: during an arbitration phase, generates the respective NRZ encoded transmission signal with the second bit rate; determines whether the respective NRZ encoded reception signal indicates that the CAN XL protocol controller may transmit data; and in response to determining that the CAN XL protocol controller may transmit data, during a data transmission phase, sets a control signal and generates the respective NRZ encoded transmission signal with the first bit rate. In an embodiment, the bus comprises: at least one logic gate, which, in operation, generates the signal at the transmission node as a logic AND combination of the second transmission signals; or a first and a second open-drain driver circuit, wherein an input of the first open-drain driver is coupled to the second transmission signal of a first CAN XL communication system of the at least two CAN XL communication systems, an input of the second open-drain driver is coupled to the second transmission signal of a second CAN XL communication system of the at least two CAN XL communication systems, and outputs of the first and the second open-drain driver circuits are coupled to the transmission node.

In an embodiment, a method comprises controlling coupling circuitry coupled to a plurality of controller area network data link layer protocol (CAN XL) communication systems, the coupling circuitry including a bus system and a switching circuit. The controlling includes, in a first mode of a plurality of modes of operation of the coupling circuitry: coupling non-return-to-zero (NRZ) encoded transmission signals of the plurality of CAN XL communication systems to the bus system; and coupling respective reception signals received from the bus to CAN XL protocol controllers of the CAN XL communication systems. In an embodiment, the coupling circuitry is coupled to a CAN XL transceiver and the controlling includes, in a second mode of operation of the coupling circuitry: coupling a first transmission signal of a first CAN XL communication system of the plurality of CAN XL communication systems to the CAN XL transceiver; and coupling a signal received from the CAN XL transceiver to the first CAN XL communication system. In an embodiment, the first transmission signal of the first CAN XL communication system is a Pulse-Width Modulated, PWM, signal.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a plurality of controller area network data link layer protocol (CAN XL) communication systems, which, in operation:
generate respective non-return-to-zero (NRZ) encoded transmission signals, the respective NRZ encoded transmission signals having respective bit rates of a plurality of bit rates;
receive respective NRZ encoded reception signals;
when the respective NRZ encoded transmission signal has a determined bit rate of the plurality of bit rates, generate respective pulse-width modulated (PWM) signals having duty cycles based on respective values of the respective NRZ encoded transmission signals; and
generate respective first transmission signals by selecting:
the respective NRZ encoded transmission signal when the respective NRZ encoded transmission signal has a bit rate different from the determined bit rate; and
the respective PWM signal when the respective NRZ encoded transmission signal has the determined bit rate;
a bus having a transmission node and a reception node and coupled to the plurality of CAN XL communication systems; and
switching circuitry having a plurality of switching modes and coupled to the bus and to the plurality of CAN XL communication systems, wherein:
the bus, in operation, receives respective second transmission signals from the plurality of CAN XL communication systems and drives a logic level at the transmission node as a function of logic levels of the respective second transmission signals; and
in a first switching mode of operation:
the switching circuitry provides the respective NRZ encoded transmission signals to the bus as the respective second transmission signals; and
the bus provides respective second reception signals to the plurality of CAN XL communication systems via the switching circuitry, the respective second reception signals having a logic level based on a logic level of the reception node of the bus.

2. The device of claim 1, comprising control circuitry, which, in operation, controls the switching circuitry.

3. The device of claim 1, comprising:
a plurality of reception terminals coupled to the switching circuitry; and
a plurality of transmission terminals coupled to the switching circuitry.

4. The device of claim 1, comprising:
a first transmission terminal coupled to the switching circuitry; and
a first reception terminal coupled to the switching circuitry, wherein the switching circuitry, in a second switching mode of operation:
provides a first transmission signal of one of the plurality of CAN XL communication systems to the first transmission terminal; and
provides a signal received at the first reception terminal to the one of the plurality of CAN XL communication systems.

5. The device of claim 3, wherein the switching circuitry, in operation, selectively connects:
the transmission node of the bus to the reception node of the bus;
the transmission node of the bus to a transmission terminal of the plurality of transmission terminals; or
the transmission node of the bus to the reception node of the bus and to a transmission terminal of the plurality of transmission terminals.

6. The device of claim 1, wherein a CAN XL communication system of the plurality of CAN XL communication systems, in operation:
during an arbitration phase, generates a respective NRZ encoded transmission signal with the bit rate different from the determined bit rate;
determines whether the respective NRZ encoded reception signal indicates that the CAN XL communication system may transmit data; and
in response to determining that the CAN XL communication system may transmit data, during a data transmission phase, generates the respective NRZ encoded transmission signal with the determined bit rate.

7. The device of claim 1, wherein the bus comprises:
at least one logic gate, which, in operation, generates the signal at the transmission node.

8. The device of claim 1, wherein the bus comprises:
a first and a second open-drain driver circuit.

9. The device of claim 1, comprising:
an integrated circuit including the plurality of CAN XL communication systems, the bus, and the switching circuitry.

10. The device of claim 1, wherein the determined bit rate is associated with a data-transmission mode of operation.

11. A system, comprising:
a first processing device; and
a second processing device coupled to the first processing device, the second processing device including:
a plurality of controller area network data link layer protocol (CAN XL) communication systems, which, in operation:
generate respective non-return-to-zero (NRZ) encoded transmission signals, the respective NRZ encoded transmission signals having respective bit rates of a plurality of bit rates;
receive respective NRZ encoded reception signals;
when the respective NRZ encoded transmission signal has a determined bit rate of the plurality of bit rates, generate respective pulse-width modulated (PWM) signals having duty cycles based on respective values of the respective NRZ encoded transmission signals; and
generate respective first transmission signals by selecting:
the respective NRZ encoded transmission signal when the respective NRZ encoded transmission signal has a bit rate different from the determined bit rate; and
the respective PWM signal when the respective NRZ encoded transmission signal has the determined bit rate;
a bus having a transmission node and a reception node and coupled to the plurality of CAN XL communication systems; and
switching circuitry having a plurality of switching modes and coupled to the bus and to the plurality of CAN XL communication systems, wherein:
the bus, in operation, receives respective second transmission signals from the plurality of CAN XL communication systems and drives a logic level at the transmission node as a function of logic levels of the respective second transmission signals; and
in a first switching mode of operation:
the switching circuitry provides the respective NRZ encoded transmission signals to the bus as the respective second transmission signals; and
the bus provides respective second reception signals to the plurality of CAN XL communication systems via the switching circuitry, the respective second reception signals having a logic level based on a logic level of the reception node of the bus.

12. The system of claim 11, wherein the first and second processing devices, in operation, generate control signals associated with a vehicle.

13. The system according to claim 11, comprising:
a CAN XL transceiver, wherein the second processing device comprises a first transmission terminal and a first reception terminal coupled to the CAN XL transceiver, and, in a second switching mode, the switching circuitry, in operation:
provides a first transmission signal of a first CAN XL communication system of the plurality of CAN XL communication systems to the first transmission terminal; and
provides a signal at the first reception terminal to one or more of the CAN XL communication systems.

14. The system according to claim 11, wherein, in the first switching mode, the switching circuitry couples the transmission node of the bus to the reception node of the bus.

15. The system according to claim 11, comprising:
a first integrated circuit including the first processing device; and
a second integrated circuit including the second processing device.

16. A method, comprising:
for each of a plurality of controller area network data link layer protocol (CAN XL) communication systems of a first processing device:
generating a non-return-to-zero (NRZ) encoded transmission signal, wherein the NRZ encoded transmission signal has a bit rate of a plurality of bit rates;
receiving a NRZ encoded reception signal;
when the NRZ encoded transmission signal has a determined bit rate of the plurality of bit rates, generating a pulse-width modulated (PWM) signal having a duty cycle based on a value of the NRZ encoded transmission signal; and
generating a transmission signal by:
selecting the NRZ encoded transmission signal as the transmission signal when the NRZ encoded transmission signal has a bit rate different from the determined bit rate; and
selecting the PWM signal as the transmission signal when the NRZ encoded transmission signal has the determined bit rate;
receiving, by a bus system of the first processing device which is coupled to the plurality of CAN XL communication systems, respective second transmission signals from the plurality of CAN XL communication systems;
driving a logic level at a transmission node of the bus system as a function of logic levels of the second transmission signals; and
in a first switching mode of operation of a plurality of switching modes of operation:
providing the NRZ encoded transmission signals of the plurality of CAN XL communication systems as the respective second transmission signals to the bus system; and
providing, to the plurality of CAN XL communication systems, respective second reception signals via the bus system.

17. The method of claim 16, comprising:
coupling the first processing device to a second processing device.

18. The method according to claim 17, comprising, in a second switching mode of operation of the plurality of switching modes of operation:
coupling, via the bus system, the first transmission signal of a first CAN XL communication system of the first processing device to a CAN XL transceiver of the second processing device; and
coupling, via the bus system, a signal received from the CAN XL transceiver of the second processing device to the first CAN XL communication system.

19. The method of claim 18, wherein the first transmission signal of the first CAN XL communication system is the PWM signal of the first CAN XL communication system.

20. The method of claim 16, comprising:
determining a mode of operation of the first processing device; and
generating the non-return-to-zero (NRZ) encoded transmission signals using a bit rate selected based on the determined mode of operation.

* * * * *